US012524535B1

(12) United States Patent
Vasudevan et al.

(10) Patent No.: US 12,524,535 B1
(45) Date of Patent: Jan. 13, 2026

(54) SYSTEM AND METHODS FOR UNFORGEABLE TELEMETRY IN THE PRESENCE OF CYBERATTACKS ON A COMPUTER PLATFORM

(71) Applicant: Uberspark Inc., Aledo, TX (US)

(72) Inventors: Amit Vasudevan, Aledo, TX (US); Ajit Vasudevan, San Jose, CA (US)

(73) Assignee: UBERSPARK INC., Aledo, TX (US)

( * ) Notice: Subject to any disclaimer, the term of this patent is extended or adjusted under 35 U.S.C. 154(b) by 0 days.

(21) Appl. No.: 19/254,764

(22) Filed: Jun. 30, 2025

Related U.S. Application Data

(60) Provisional application No. 63/714,176, filed on Oct. 31, 2024.

(51) Int. Cl.
  *G06F 21/55* (2013.01)
(52) U.S. Cl.
  CPC ...... *G06F 21/554* (2013.01); *G06F 2221/034* (2013.01)
(58) Field of Classification Search
  None
  See application file for complete search history.

(56) References Cited

U.S. PATENT DOCUMENTS

| | | | |
|---|---|---|---|
| 8,627,414 B1 | 1/2014 | McCune et al. | |
| 9,177,153 B1* | 11/2015 | Perrig | G06F 21/57 |
| 9,542,557 B2* | 1/2017 | Paek | G06F 21/52 |
| 12,093,367 B2* | 9/2024 | Vasudevan | G06F 9/4812 |
| 2010/0192130 A1* | 7/2010 | Hawblitzel | G06F 9/44589 717/126 |
| 2015/0019191 A1* | 1/2015 | Maturana | G05B 19/0423 703/13 |

(Continued)

FOREIGN PATENT DOCUMENTS

WO  2024163410 A1  8/2024

OTHER PUBLICATIONS

Mccormack et al. "Formalizing an Architectural Model of a Trustworthy Edge IoT Security Gateway", In 2021 IEEE 27th International Conference on Embedded and Real-Time Computing Systems and Applications. Aug. 18, 2021 (pp. 93-102). IEEE. (Year 2021).

(Continued)

*Primary Examiner* — Kaveh Abrishamkar
(74) *Attorney, Agent, or Firm* — Zachary M. Thomas

(57) ABSTRACT

System and methods are disclosed for providing unforgeable telemetry on computer platforms. Mathematical modeling and theorem proving are utilized to guarantee the integrity of telemetry probe execution flow and trigger, thereby preventing circumvention and tampering of logged probe data. In contrast to current state-of-the-art solutions that rely implicitly on the operating environment, this approach provides a sound and complete assurance of telemetry output. The system enables organizations to map unforgeable telemetry probe data to industry and government cybersecurity regulatory controls, ensuring compliance therewith. This invention addresses the shortcomings of existing solutions, including their vulnerability to sophisticated attacks, operational complexity, and inability to provide unforgeable telemetry data, thereby providing a reliable and accurate monitoring output in the presence of cyberattacks on computer platforms.

21 Claims, 10 Drawing Sheets

(56) References Cited

U.S. PATENT DOCUMENTS

| | | | | |
|---|---|---|---|---|
| 2019/0340357 | A1* | 11/2019 | David | G06F 21/568 |
| 2020/0034538 | A1* | 1/2020 | Woodward | G06F 21/566 |
| 2022/0414026 | A1* | 12/2022 | Iyer | G06F 21/554 |
| 2024/0143768 | A1* | 5/2024 | Kondapi | G06F 21/572 |
| 2024/0267736 | A1* | 8/2024 | Vasudevan | G06F 21/606 |
| 2024/0289432 | A1* | 8/2024 | Vasudevan | G06F 21/602 |
| 2024/0346132 | A1* | 10/2024 | Vasudevan | G06F 21/53 |
| 2025/0077654 | A1* | 3/2025 | Farley | G06F 9/45558 |

OTHER PUBLICATIONS

Derakhshan et al. "Towards End-to-End Verified TEEs via Verified Interface Conformance and Certified Compilers", In 2023 IEEE 36th Computer Security Foundations Symposium, Jul. 10, 2023 (pp. 324-339). IEEE. (Year 2023).
Vasudevan et al. "uberSpark: Practical, Provable, End-to-End Guarantees on Commodity Heterogenous Interconnected Computing Platforms", ACM SIGOPS Operating Systems Review. Aug. 2020. 31; 54(1):8-22. (Year 2020).
Mccormack et al. "JETFIRE: A Low-Cost, Trusted IoT Security Gateway", Carnegie Mellon University CyLab, (Year 2020).
Erata Ferhat et al: "Survey of Approaches and Techniques for Security Verification of Computer Systems", ACM Journal On Emerging Technologies in Computing Systems (JETC), ACM, 2 Penn Plaza, Suite 701 New York NY 10121-0701, USA, vol. 19, No. 1, Jan. 19, 2023 (Jan. 19, 2023), pp. 1-34.
Invitation to pay additional fees and, where applicable, protest fee; International Application No. PCT/US2025/035864, dated Oct. 2, 2025, issued by the European Patent Office (ISA/EP).

* cited by examiner

SYSTEM AND METHODS FOR UNFORGEABLE TELEMETRY IN THE PRESENCE OF CYBERATTACKS ON A COMPUTER PLATFORM

RELATED APPLICATIONS

This application claims the benefit of U.S. Provisional Application No. 63/714,176 filed on Oct. 31, 2024, which is herein incorporated by reference in its entirety.

TECHNICAL FIELD

The present disclosure relates to at least the field of design of computer platforms including cybersecurity.

BACKGROUND ART

The subject matter discussed in the background section should not be considered prior art merely because of its mention in the background section. Similarly, a problem mentioned in the background section or associated with the subject matter of the background section should not be considered to have been previously recognized in the prior art. The subject matter in the background section merely represents different approaches, which in and of themselves, may also correspond to claimed embodiments.

Cyberattacks are an ever-present risk associated with modern computer platforms. Maintaining cybersecurity is a challenge for individuals, businesses, government and other organizations.

In U.S. Pat. No. 8,627,414 issued Jan. 7, 2014, inventors McCune et al. disclose a computer including a processor and a verification device. The processor in the computer performs the steps of authenticating a secure connection between a hypervisor and the verification device, measuring the identity of at least a portion of a select guest before the select guest executes any instruction, and sending a measurement of the identity of the select guest to the verification device. The verification device compares the policy stored in the verification device with the measurement of the select guest received by the verification device. The steps of authenticating, measuring, sending, and comparing are performed after receiving a signal indicative of a request to execute the selected guest and without rebooting the computer.

In U.S. Pat. No. 12,093,367 issued Sep. 17, 2024, inventor Amit Vasudevan discloses a system architecture that structures commodity heterogeneous interconnected computer platforms around universal object abstractions, which are a fundamental system abstraction and building block that provides practical and provable end-to-end guarantees of security, correctness, and timeliness for the platform.

In U.S. patent application Ser. No. 19/071,693 filed on Mar. 5, 2025, the entirety of which is incorporated herein by reference, inventors Amit Vasudevan et al., disclose systems and methods for mathematical modeling of the hardware and software stack of commodity computer platforms. The mathematical model provides provable guarantees on memory, device, and program execution. This approach addresses the technical problem of reliance on system agents that rely on implicit trust in the operating environment, which can be exploited by sophisticated attackers using complex threats such as memory access exploits and code/data integrity exploits. The solution provides a proactive, mathematically-backed security solution that eliminates entire classes of cyberattacks by design, ensuring realizable guarantees on commodity computer platforms running hardware and software stack elements at the lowest operating level. This approach has significant advantages over reactive cybersecurity methods, including reduced complexity and overhead, and increased confidence in the integrity of the system. The solution's main uses include providing mathematically-backed security and availability guarantees for critical infrastructure, financial institutions, and other organizations vulnerable to cyberattacks.

SUMMARY

Some aspects relate to A computer platform comprising at least one peripheral; at least one processor; and at least one non-transitory computer-readable storage medium having stored thereon a set of programs, the programs of the set of programs executable by the at least one processor, having respective code paths, different privilege levels and utilizing different memory address spaces of the at least one non-transitory computer-readable storage medium; a telemetry provisioner that utilizes a mathematical model of the computer platform to identify and implant immutable telemetry probes in code paths of a subset of the set of programs; and wherein, the set of programs includes a set of secure-kernel programs and a set of regular programs; the mathematical model includes a formal representation of the the at least one processor, the at least one non-transitory computer-readable storage medium, the at least one peripheral, and the set of programs, and defines and proves a security property that ensures execution flow of the programs in the set of programs follows the respective code paths; and the telemetry provisioner uses the mathematical model to determine probe placement and configuration to monitor and enforce telemetry execution flow and trigger integrity; and a subset of the set of secure-kernel programs utilizes the mathematical model to enforce the security property at runtime by verifying that the execution flow of the programs in the set of programs conforms to the mathematical model.

In some embodiments of the computer platform the at least one peripheral, the at least one processor, and the at least one non-transitory computer-readable storage medium are hardware elements of the computer platform; the programs in the set of programs are software stack elements; the mathematical model stored on the at least one non-transitory computer-readable storage medium further defines operational aspects of the hardware elements and software stack elements; the mathematical model further defines predicates that are translatable to proof obligations; and the mathematical model includes a theorem prover to interpret and verify the proof obligations.

In some embodiments of the computer platform at least one of the memory address spaces includes a secure memory region to store telemetry probe data collected from the immutable telemetry probes in an append-only fashion.

In some embodiments of the computer platform the set of secure-kernel programs includes a platform signing agent to transmit the telemetry probe data from the secure memory region to a non-volatile portion of the at least one non-transitory computer-readable storage medium.

In some embodiments of the computer platform the at least one peripheral includes a network interface, the set of secure-kernel programs includes a platform signing agent to transmit the telemetry probe data from the secure memory region to a remote computer platform over the network interface.

In some embodiments of the computer platform the at least one non-transitory computer-readable storage medium has stored thereon an alignor to align a branch or target address on valid processor instruction boundaries and to check that a target memory location of indirect calls matches a secure kernel or regular program function defined type hash (hash of a function prototype).

In some embodiments of the computer platform the programs in the set of programs comprise forward edge execution flow integrity (EFI) protection, backward edge execution flow integrity (EFI) protection, and stack-frame protection.

In some embodiments of the computer platform when a member of the set of secure-kernel programs is executed by the at least one processor the computer platform loads a subset of the set of regular programs within a given privilege level and memory address space of the computer platform.

In some embodiments of the computer platform when a member of the set of secure-kernel programs is executed by the at least one processor the computer platform loads a first secure-kernel program of the set of secure-kernel programs and a subset of the set of regular programs within a privilege level different from the member and a memory address space different from the member, and validates an integrity of the first secure-kernel program.

In some embodiments of the computer platform a member of the set of secure-kernel programs, when executed by the at least one processor, establishes a memory protected probe data log in the at least one non-transitory computer-readable storage medium, the memory protected probe data log being protected from unauthorized access from non-secure kernel elements and is only accessible by the set of secure secure-kernel programs.

In some embodiments of the computer platform the set of secure-kernel programs comprises a logging function that, when executed by the at least one processor, records telemetry data from the immutable telemetry probes to the memory protected probe data log periodically based on a periodic secure timer.

In some embodiments of the computer platform the periodic secure timer is implemented in hardware. In some embodiments of the computer platform the periodic secure timer is implemented in software pre-emption.

In some embodiments of the computer platform the logging function, when executed by the at least one processor, transmits contents of the memory protected probe data log to a local or remote computer platform and resets the memory protected probe data log thereafter.

In some embodiments of the computer platform further comprising a signing agent, wherein the logging function utilizes the signing agent to transmit the contents of the memory protected probe data log to the local or remote computer platform.

In some embodiments of the computer platform the member implements hardware memory protections in the at least one non-transitory computer-readable storage medium where the memory protected probe data log is stored to provide isolation from any other members of the set of programs.

In some embodiments of the computer platform the member utilizes software memory isolation techniques via software verification or fault isolation to secure the memory protected probe data log from any other members of the set of programs.

In some embodiments of the computer platform a member of the set of secure-kernel programs, when executed by the at least one processor, provides a logging interface invokable by the immutable telemetry probes.

In some embodiments of the computer platform the logging interface comprises an interface to add telemetry probe data to the memory protected probe data log in an append-only fashion; and if an invocation of the logging interface results in the memory protected probe data log being full, the computer platform transmits the memory protected probe data log to a local or remote computer platform.

In some embodiments of the computer platform the telemetry provisioner computes original hash values; the set of secure kernel programs comprises a telemetry probe authorization module that, when executed by the at least one processor, validates the immutable telemetry probes; the telemetry probe authorization module includes a hashmap for mapping program code regions to the original hash values; and the telemetry probe authorization module computes a hash of the program code regions and compares it to the respective original hash value, and if the comparison is successful (a match), control is transferred to an entry point of of the program, and if the comparison is unsuccessful (not a match) an error is logged into a memory protected probe data log and the program is terminated.

In some embodiments of the computer platform the telemetry probe authorization hashmap can be provisioned during system design time within the secure kernel or can be obtained at system runtime via a remote platform by the secure kernel In some embodiments of the computer platform a subset of the set of secure-kernel programs modifies a telemetry probe among the immutable telemetry probes by (i) marking a code region of the telemetry probe read-write using a memory protection mechanism, (ii) changing code for the telemetry probe at a target location with a telemetry probe code template, (iii) marking the code region of the telemetry probe read-only using the memory protection mechanism, (iv) comparing a hash of the telemetry probe code to a hash of the telemetry probe code template, wherein a match signifies a successful telemetry probe code modification, and (v) if the comparing does not yield a match, logging an error in a telemetry probe log.

In some embodiments of the computer platform the set of secure-kernel programs ensure that each program in the set of programs has the memory address space its code is located in write protected using a memory protection mechanism.

In some embodiments of the computer platform the at least one processor has a plurality of hardware operating modes; a first member of the set of secure-kernel programs, when executed by the at least one processor, operates in a first of the plurality of hardware operating modes and a first region of the memory address space; a second member of the set of secure-kernel programs, when executed by the at least one processor, operates in a second of the plurality of hardware operating modes and a second region of the memory address space, the second operating mode has a higher privilege level than the first operating mode; the second region of the memory address space has a higher privilege level than the first region of the memory address space; and the first member utilizes services offered by the second member.

In some embodiments of the computer platform a member of the set of secure-kernel programs transfers probe data collected by the immutable telemetry probes to a security incident and event management (SIEM) tool on a local or remote computer platform.

In some embodiments of the computer platform a signing agent establishes the authenticity of the probe data.

In some embodiments of the computer platform an authentication and authorization module uses a signing agent to authenticate and authorize access to the probe data on the remote machine.

In some embodiments of the computer platform the signing agent further comprises a mechanism to cryptographically establish authenticity of the probe data via a physical hardware trusted platform module.

In some embodiments of the computer platform the signing agent further comprises a mechanism to cryptographically establish authenticity of the probe data via a virtual trusted platform module entirely realized in software.

In some embodiments of the computer platform the signing agent further comprises a mechanism to cryptographically establish authenticity of probe data via a remote trusted platform module residing on another computer platform and connected via a network connection.

In some embodiments of the computer platform the signing agent stores the probe data on a non-volatile storage media within the local and/or remote computer platform.

In some embodiments of the computer platform the member of the set of secure-kernel programs transferring the probe data utilizes a secure communication module that enables transfer of the mapped probe data to a local program or a remote machine using Secure Sockets Layer (SSL) or Transport Layer Security (TLS) encryption.

In some embodiments of the computer platform the secure communication module is implemented in hardware. In some embodiments of the computer platform the secure communication module is implemented in software.

In some embodiments of the computer platform the immutable telemetry probes collect telemetry probe data which is then mapped to cybersecurity regulatory control levels specified in a cybersecurity compliance frameworks, the cybersecurity compliance frameworks selected from the group consisting of industry-specific and government/federal agency specific guidelines.

In some embodiments of the computer platform the mapping assigns specific weights to different cybersecurity compliance frameworks based on relevance and importance to the particular application, industry or government/federal sector.

In some embodiments of the computer platform the mapping utilizes a machine learning algorithm to identify patterns and anomalies in the probe data that can then serve to indicate potential security threats.

In some embodiments of the computer platform the mapping utilizes a machine learning algorithm to identify patterns and anomalies in the probe data that can then serve as an audit control report.

In some embodiments, the computer platform further comprises a mechanism to represent the mapping as at least one of the group consisting of textual information, graphical user interface, and raw binary data.

In some embodiments, the computer platform further comprises a graphical user interface (GUI) display that presents the mapped probe data in a format selected from the group consisting of textual, raw, and graphical.

In some embodiments, the computer platform further comprises an alerting mechanism that creates an alert when specific thresholds or criteria are met based on the mapped probe data.

In some embodiments, the computer platform further comprises an alerting mechanism that creates alerts based on the mapped probe data when specific cybersecurity regulatory controls are violated.

In some embodiments, the computer platform further comprises an analytics module that provides detailed analysis and insights into the mapped data, including trends, patterns, and recommendations for improvement.

In some embodiments of the computer platform the telemetry provisioner embeds the security property at the source code level in a subset of the set programs.

In some embodiments of the computer platform the telemetry provisioner embeds the security property at the binary level in a subset of the set of programs.

In some embodiments of the computer platform the memory address spaces each have code memory regions storing binaries for the respective program in the set of programs; and the subset of the set of secure-kernel programs employs hardware capabilities of the memory address spaces to set the code memory regions as read-only with respect to other programs in the set of programs and with respect to the at least one peripheral.

In some embodiments of the computer platform the memory address spaces each have code memory regions storing binaries for the respective program in the set of programs; and software based verification or software fault isolation is implemented to set the code memory regions for each of the respective programs in the set of programs as read-only with respect to other programs in the set of programs and with respect to the at least one peripheral.

In some embodiments of the computer platform the memory address spaces each have memory regions storing a procedure linkage table (PLT) for the respective program in the set of programs; and the subset of the set of secure-kernel programs employs hardware capabilities of the memory address spaces to set the memory regions as read-only with respect to other programs in the set of programs and with respect to the at least one peripheral.

In some embodiments of the computer platform the memory address spaces each have memory regions storing a procedure linkage table (PLT) for the respective program in the set of programs; and software based verification or software fault isolation is implemented to set the memory regions for each of the respective programs in the set of programs as read-only with respect to other programs in the set of programs and with respect to the at least one peripheral.

In some embodiments of the computer platform the at least one non-transitory computer-readable storage medium has stored thereon a validator to validate that a target address of a branch or jump operation within a function, which itself is within the set of programs, is within a valid memory range or points to a valid program function in a same memory address space.

In some embodiments of the computer platform a program among the set of programs has backward edge execution flow integrity protection including a meta-stack mechanism that, during execution of a function of the program by the at least one processor, ensures the function writes a local variable to a local stack, and when the function of the program is complete a meta stack is utilized to obtain a return instruction pointer.

In some embodiments of the computer platform the backward edge execution flow integrity protection further includes a second mechanism to ensure the return instruction pointer is to a location in code for the program that follows an original call to the function by comparing a function-defined type hash with a hash value stored in a program code region adjacent to a location of the original call.

In some embodiments of the computer platform the at least one non-transitory computer-readable storage medium further has stored thereon a protection mechanism to protection against stack frame attacks, the protection mechanism having a respective stack canary value stored at a location within a stack frame of each member of the set of programs, the location being at a beginning of the stack frame before a memory location of a first local variable for the respective program.

In some embodiments of the computer platform during execution of a program of the set of programs, the protection mechanism compares the respective stack canary value for said program to a magic value stored in association with said respective stack canary value, and if the comparison does not yield a match, the protection mechanism logs probe data indicating a stack frame violation event.

Another aspect relates to a method comprising creating a mathematical model of a computer platform, wherein the mathematical model includes a representation of a telemetry execution flow and trigger integrity (TEFTI) security property; analyzing the mathematical model to determine whether the TEFTI security property is satisfied, the analyzing comprising encoding the TEFTI security property into a computer-assisted theorem proving system; and using the computer-assisted theorem proving system to analyze the mathematical model and determine if the TEFTI security property is satisfied; and generating a telemetry provisioner for configuring a set of programs with a set of rules to collect and log telemetry data, wherein the set of programs includes the set of secure-kernel programs and a set of regular programs; and the telemetry provisioner ensures that the TEFTI security property is preserved by the set of rograms during system runtime.

In some embodiments the method further comprises loading the set of secure-kernel programs and the telemetry provisioner onto an instance of the computer platform modeled by the mathematical model.

In some embodiments of the method the telemetry provisioner ensures the TEFTI security property is preserved during runtime by using a source-code or binary-level modification technique to embed the TEFTI security property into a subset of the set of programs; implementing memory protection mechanisms to prevent modifications to code regions and procedure linkage table (PLT) regions of the subset of the set of programs; and configuring the subset of the set of programs to enforce control flow integrity (CFI) and protect stack frames.

In some embodiments of the method creating the mathematical model of the computer platform comprises using a formal verification technique.

In some embodiments of the method the set of rules to collect and log telemetry data includes collecting address space information for each process; collecting process identifier information for each process; collecting register state information for each process; collecting time information for each process; collecting function name information for each function call; collecting parameter information for each function call; collecting stack trace variable information for each function call; and logging program data flow information.

In some embodiments of the method the set of rules to collect and log telemetry data includes monitoring program behavior to detect cyber attacks; analyzing telemetry data to identify patterns indicative of cyber attacks; generating alerts in response to detected cyber attacks; and logging program data flow information to facilitate incident response.

In some embodiments of the method the set of rules to collect and log telemetry data includes defining a set of thresholds for each type of telemetry data; comparing telemetry data to the defined thresholds; and generating alerts in response to exceeded thresholds.

Yet another aspect relates to a system for generating a telemetry provisioner and set of secure-kernel programs, the system comprising a mathematical model creation module that creates a mathematical model of a computer platform; a theorem proving module that analyzes the mathematical model to determine whether a telemetry execution flow and trigger integrity (TEFTI) security property is satisfied; a code generation module that generates the set of secure-kernel programs that enforce the TEFTI security property; and a telemetry provisioner generation module that generates a telemetry provisioner for configuring a set of programs with a set of rules to collect and log telemetry data, wherein the telemetry provisioner ensures that the TEFTI security property is preserved by the set of programs during runtime on the computer platform, and the set of programs comprises the set of secure-kernel programs and a set of regular programs.

In some embodiments, the system further comprises the computer platform, the computer platform having at least one processor and at least one non-transitory computer-readable storage medium, the at least one non-transitory computer-readable storage medium having stored thereon the set of programs and the telemetry provisioner, wherein the set of programs and the telemetry provisioner comprise code executable by the at least one processor.

In some embodiments of the system, during runtime on the computer platform, the telemetry provisioner ensures the TEFTI security property is preserved by using a source-code or binary-level modification technique to embed the TEFTI security property into a subset of the set of programs implementing memory protection mechanisms to prevent modifications to code regions and procedure linkage table (PLT) regions of the subset of the set of programs; and configuring the subset of the set of programs to enforce control flow integrity (CFI) and protect stack frames.

In some embodiments of the system, the mathematical model creation module uses a formal verification technique to create the mathematical model.

In some embodiments of the system, the set of rules to collect and log telemetry data includes collecting address space information for each process; collecting process identifier information for each process; collecting register state information for each process; collecting time information for each process; collecting function name information for each function call; collecting parameter information for each function call; collecting stack trace variable information for each function call; and logging program data flow information.

In some embodiments of the system, the set of rules to collect and log telemetry data includes monitoring program behavior to detect cyber attacks; analyzing telemetry data to identify patterns indicative of cyber attacks; generating alerts in response to detected cyber attacks; and logging program data flow information to facilitate incident response.

In some embodiments of the system, the set of rules to collect and log telemetry data includes defining a set of thresholds for each type of telemetry data; comparing telemetry data to the defined thresholds; and generating alerts in response to exceeded thresholds.

Another aspect relates to at least one computer-readable storage medium having stored thereon instructions which, when executed, program at least one processor to perform a method comprising acts of creating a mathematical model of a computer platform, wherein the mathematical model includes a representation of a telemetry execution flow and trigger integrity (TEFTI) security property; analyzing the mathematical model to determine whether the TEFTI security property is satisfied, the analyzing comprising encoding the TEFTI security property into a computer-assisted theorem proving system; and using the computer-assisted theorem proving system to analyze the mathematical model and determine if the TEFTI security property is satisfied; and generating a telemetry provisioner for configuring a set of programs with a set of rules to collect and log telemetry data, wherein the set of programs includes the set of secure-kernel programs and a set of regular programs; and the telemetry provisioner ensures that the TEFTI security property is preserved by the set of programs during system runtime.

In some embodiments of the at least one computer-readable storage medium the telemetry provisioner ensures the TEFTI security property is preserved during runtime by using a source-code or binary-level modification technique to embed the TEFTI security property into a subset of the set of programs; implementing memory protection mechanisms to prevent modifications to code regions and procedure linkage table (PLT) regions of the subset of the set of programs; and configuring the subset of the set of programs to enforce control flow integrity (CFI) and protect stack frames.

In some embodiments of the at least one computer-readable storage medium creating the mathematical model of the computer platform comprises using a formal verification technique.

In some embodiments of the at least one computer-readable storage medium the set of rules to collect and log telemetry data includes collecting address space information for each process; collecting process identifier information for each process; collecting register state information for each process; collecting time information for each process; collecting function name information for each function call; collecting parameter information for each function call; collecting stack trace variable information for each function call; and logging program data flow information.

In some embodiments of the at least one computer-readable storage medium the set of rules to collect and log telemetry data includes monitoring program behavior to detect cyber attacks; analyzing telemetry data to identify patterns indicative of cyber attacks; generating alerts in response to detected cyber attacks; and logging program data flow information to facilitate incident response.

In some embodiments of the at least one computer-readable storage medium the set of rules to collect and log telemetry data includes defining a set of thresholds for each type of telemetry data; comparing telemetry data to the defined thresholds; and generating alerts in response to exceeded thresholds.

Another aspect relates to a method of mapping telemetry probe data in classifications of a control specification, the method comprising acts of receiving telemetry probe data; and parsing the telemetry probe data into the classifications of the control specification.

In some embodiments of the method the control specification is a cybersecurity regulatory control.

In some embodiments of the method the parsing comprises mapping a first portion of telemetry probe data that captures details of cyber-attacks that are prevented on one or more programs to a first classification in the control specification; mapping a second portion of the telemetry probe data that collects information about data flow between one or more programs to a second classification in the control specification; and mapping a third portion of the telemetry probe data that collects monitoring information from monitoring one or more programs to a third classification in the control specification.

In some embodiments, the method further comprises implanting first immutable telemetry probes in the code of secure-kernel programs and regular programs in a memory address space to collect the first portion of telemetry probe data; implanting second immutable telemetry probes in the code of secure-kernel programs and regular programs in a memory address space to collect the second portion of telemetry probe data; implanting third immutable telemetry probes in the code of secure-kernel programs and regular programs in a memory address space to collect the third portion of telemetry probe data; and collecting the telemetry probe data with the telemetry probes.

In some embodiments, the method further comprises implanting an immutable telemetry probe in code of a program in a memory address space, the program among secure-kernel programs and regular programs; and collecting the telemetry probe data with the immutable telemetry probe.

In some embodiments of the method the implanting comprising placing the immutable telemetry probe at a start, end, or within a function, and the function is within the code of the program.

In some embodiments of the method the implanting comprises embedding one or more processor instructions into the code of the program, and the collecting comprises accessing memory regions in the memory address space.

In some embodiments of the method the code is source code and the implanting comprises modifying the source code of the program; and compiling the modified source code into binary.

In some embodiments of the method the code is binary code, and the implanting comprises using binary rewriting to modify the binary code of the program.

In some embodiments of the method the collecting the telemetry probe data with the immutable telemetry probe comprises providing a processor address space and identifier, providing a processor register state at a time the immutable telemetry probe is invoked, providing a program stack including back traces, providing a function name and formal parameters for the program, and storing the probe telemetry data at the memory address space.

In some embodiments of the method the immutable telemetry probe is a first immutable telemetry probe and the program is a first program at a first privilege level, the method further comprising implanting a second immutable telemetry probe within a second program at a second privilege level, the second program also among secure-kernel programs and regular programs.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures may be represented by a numeral. For purposes of clarity, not every component may be labeled in every drawing. In the drawings.

DETAILED DESCRIPTION

Figure 1:
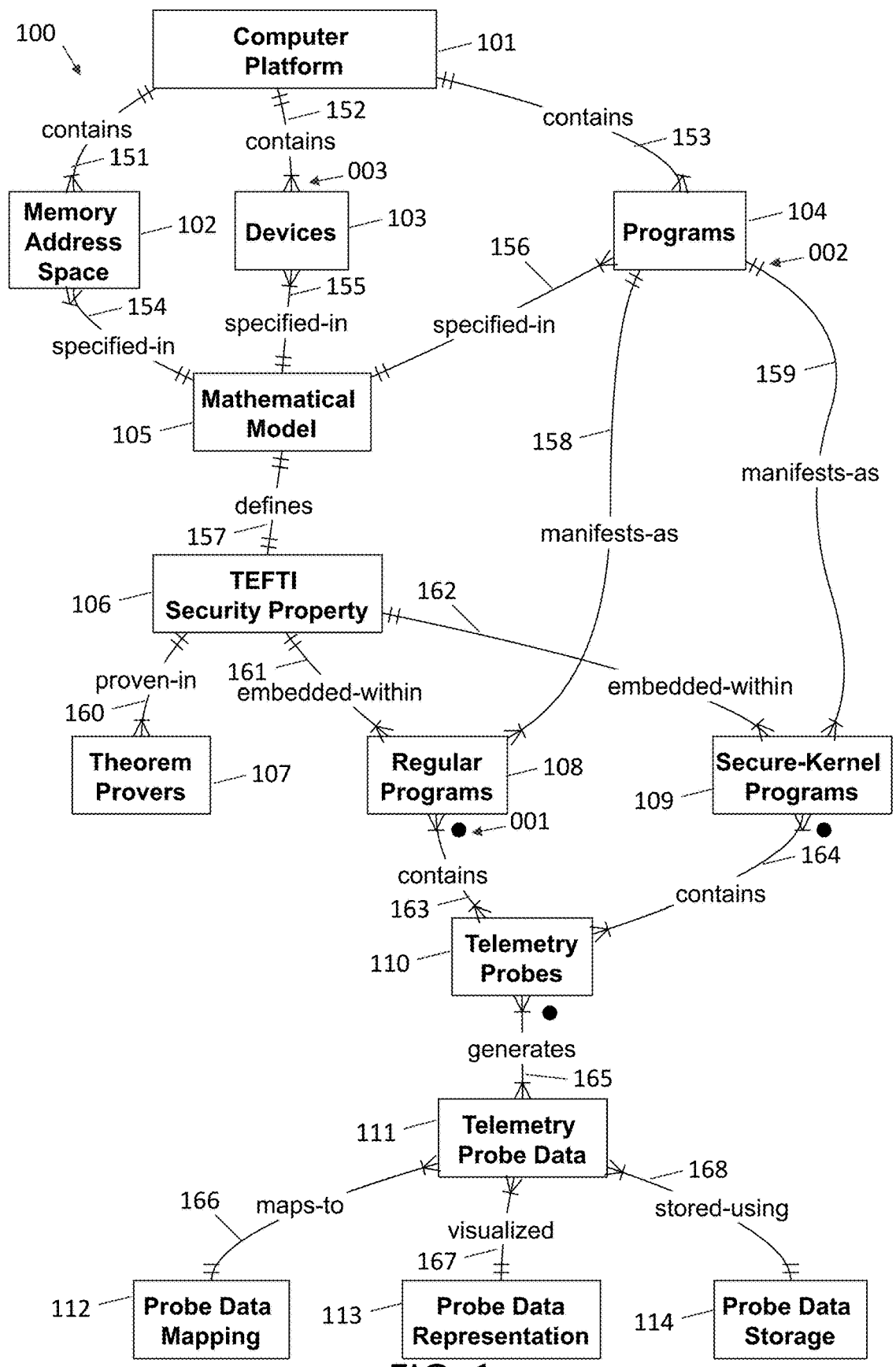
FIG. 1 shows a system 100 for unforgeable telemetry in the presence of cyberattacks on a computer platform 101, according to some embodiments.

The current state of the art in telemetry on computer platforms is characterized by an increasing reliance on system agents to implement desired telemetry operations. These agents make use of the underlying operating environment (e.g., hypervisor, kernel, firmware, shared libraries) in conjunction with artificial intelligence (AI) and machine learning (ML) including runtime introspection and monitoring frameworks to effect telemetry output. This approach has been widely adopted due to its potential for high accuracy and efficiency in capturing system behavior and security incidents. However, despite these benefits, this method also suffers from several significant shortcomings.

One of the primary disadvantages of current state-of-the-art solutions is their implicit trust in the underlying operating environment. When a telemetry agent relies on the operating environment to function correctly, it creates a vulnerability that can be exploited by sophisticated attackers. In particular, complex attacks such as remote code execution, advanced persistent threats, and ransomware can compromise telemetry agents by exploiting memory access vulnerabilities like temporal and spatial buffer overflows, arbitrary pointer access, NULL pointer dereferencing, Code and data integrity exploits such as code overwriting, DMA attacks, Return-oriented programming attacks and return-to-libc. This vulnerability undermines the effectiveness of current state-of-the-art solutions in providing reliable and accurate telemetry output.

Furthermore, current telemetry agents often require extensive manual configuration and maintenance, which can be time-consuming and prone to human error. This aspect of current state-of-the-art solutions increases their operational complexity, making them more difficult to deploy and manage in large-scale environments. As a result, the use of these solutions can lead to increased overhead costs and decreased system availability.

The overarching critical limitation of current telemetry approaches is their inability to provide unforgeable telemetry data. This means that telemetry data can be easily manipulated or fabricated, leading to inaccurate or misleading information about system behavior and security incidents. The lack of unforgeable telemetry capabilities makes it challenging for organizations to establish trust in the accuracy and reliability of their system monitoring output.

Accordingly, some aspects of the present application relate to a novel solution that stands out from current state-of-the-art solutions by offering a fundamentally different approach to delivering unforgeable telemetry on computer platforms. Some embodiments aim to combine mathematical modeling with theorem proving to provide a sound and complete guarantee of telemetry probe execution flow and trigger integrity, thereby ensuring that a telemetry probe cannot be circumvented and the logged probe data cannot be tampered with. Additionally, some embodiments will enable organizations to map unforgeable telemetry probe data to common industry and government standard cybersecurity regulatory controls, thus enabling enterprises using critical infrastructure to stay compliant with cybersecurity regulations.

The following nomenclature is used herein:

Theorem prover: In the context of mathematical modeling, a theorem prover refers to a software tool or system that assists in the formal proof and verification of mathematical statements or theorems. Theorem provers use logical and mathematical rules to check the validity of a proof, ensuring that it is correct and rigorous, and providing a high degree of confidence in the results. They are often used to verify the correctness of mathematical models, specifications, and algorithms, and to establish the soundness and completeness of formal systems. Theorem provers can be completely automated (i.e., require no user intervention) or interactive (i.e., require some amount of user intervention).

Invariant: In the context of mathematical modeling, an invariant refers to a property or quantity that remains unchanged or constant despite transformations, changes, or perturbations to the computer platform (an "immutable property"). Invariants are used to describe and analyze the behavior of complex systems, and can include quantities such as security, liveness, energy, time or symmetry, which remain preserved over time or under different conditions.

Security property: In the context of cybersecurity, a security property refers to a specific attribute or characteristic of a system, network, or asset that is related to its security, such as confidentiality, integrity, availability, authenticity, or non-repudiation. Security properties define the desired security behavior or constraints of a system, and are often used to evaluate the effectiveness of security controls, protocols, or mechanisms in protecting against threats or vulnerabilities. A model security property is a security property codified in a mathematical model.

Cybersecurity regulation: A set of laws, guidelines, standards, or best practices that govern the protection of computer systems, networks, and sensitive information from cyber threats. Cybersecurity regulations aim to ensure the confidentiality, integrity, and availability of digital assets, and typically outline requirements for security controls, incident response, data breach notification, and compliance reporting.

Cybersecurity regulatory controls: In simple terms, cybersecurity regulatory controls refer to the rules and guidelines set by governments or industry bodies that organizations must follow to protect their computer systems, networks, and data from cyber threats. These controls are designed to ensure that companies take necessary measures to prevent, detect, and respond to cyber-attacks. Think of them as a set of checks and balances that help organizations safeguard sensitive information and maintain the trust of their customers.

Cybersecurity compliance framework: A cybersecurity compliance framework is like a roadmap that helps organizations navigate the complex landscape of cybersecurity regulatory controls. It is a structured approach that outlines the policies, procedures, and standards required to ensure that an organization meets the necessary cybersecurity regulations and industry standards. In essence, it is a framework that provides a clear understanding of what needs to be done to achieve compliance with relevant laws, regulations, and standards, such as HIPAA, PCI-DSS, or NIST.

Telemetry: Telemetry refers to the automatic collection and transmission of data from devices, systems, or applications to a central location for monitoring, analysis, and decision-making. In the context of cybersecurity, telemetry is used to gather information about system performance, user behavior, network traffic, and other relevant metrics to detect potential security threats. Think of it like a car's onboard computer sending diagnostic data to the manufacturer for analysis. Similarly, in cybersecurity, telemetry helps organizations identify vulnerabilities, detect anomalies, and respond quickly to security incidents by providing real-time insights into their systems and networks.

Operational state space: In the context of mathematical modeling, an operational state space refers to the set of all possible states that a computer platform can occupy during its operation, including its current conditions, configurations, and modes. The operational state space specifies the boundaries and constraints within which the computer platform, and is used to analyze, simulate, and predict the behavior of the system over time.

Hardware elements: The hardware components of a computer platform such as memory, processors, peripherals, and other hardware components of the computer platform. Memory may include any type of volatile or non-volatile memory that may be part of the computer platform. Processors includes processing devices such as for example and not limitation, central processing units (CPUs) including single and multi-core designs, digital signal processor (DSPs), controllers, general or special purpose microprocessors, microcontrollers, field programmable gate arrays (FPGAs), application specific integrated circuits (ASICs), or any suitable processing device. In some embodiments, the computer platform may have one or more processors of the same or different types. Peripherals provide the input and output hardware that the computer platform uses to interface outside itself. These could include sensors, network interfaces, user interface devices, and any other suitable component for interfacing outside the computer platform itself.

Software stack elements: Provide instructions that can be operated on by the processor(s) of the computer platform. Instructions may be in the form of computer code. Such processor executable instructions may be referred to as program execution elements. Program execution elements may be composed of functions and instructions within functions as atomic execution units, which access platform memory and peripherals through prescribed interfaces. Examples of software stack elements include, but are not limited to, bios, operating systems (OS), hypervisors, trusted execution environment, libraries application, and other suitable software. In some embodiments, program execution elements may be run on the same processor or be spread across different processors.

Operational aspects: The fundamental capabilities for each of the hardware elements and the software stack elements. The operational aspects of a memory may include, for example, read, write, and execute. The operational aspects of a processor may include executing instructions and manipulating hardware registers, The operational aspects of a peripheral may include input from a keyboard, mouse, camera etc. and output to a printer, disk or other forms of storage media. The operational aspects of a program execution element may include reading file, writing to a file and read/write from/to a peripheral.

Program code or Code: Program code or simply code refers to the set of instructions written in a programming language that a computer executes to perform a specific task or achieve a desired outcome. Code can either be in binary format (encoded instructions in the computer platform) or source format (encoded in a specific programming language such as C, Assembly or Java)

Program code region: A program code region refers to a specific section or module within a larger software application where certain functionality is implemented, such as data processing, authentication, or encryption, and can be defined by boundaries like functions, classes, or namespaces.

Code path: A program "code path" refers to the specific sequence of instructions that a computer program executes as it runs, kind of like a chosen route on a map. Think of it like a decision tree, where the program makes choices based on conditions and inputs, and each choice leads to a different set of instructions being executed, resulting in a unique "path" through the code. This is crucial for security, as vulnerabilities can often be exploited by tricking the program into taking an unintended path As shown in FIG. 1, some embodiments in the present application relate to a system 100 for providing unforgeable telemetry in the presence of cyberattacks on a computer platform 101. System 100 comprises a mathematical model 105 of computer platform 101, including its processor, device, memory, and executing programs.

Mathematical model 105 is a specification of computer platform 101 that defines the operational state space of the platform hardware elements and programs running on one or more computing processors of computer platform 101. Specifically, model 105 includes programs comprising one or more secure-kernel programs 109 and one or more regular programs 108 that can run in different memory address spaces 102 and privilege levels.

The telemetry provisioner 303 implants immutable telemetry probes 110 on secure kernels 109 and regular programs 108. The Telemetry Execution Flow and Trigger Integrity (TEFTI) security property 106 is defined and proven in the mathematical model 105 of computer platform 101 at design time. This security property 106 ensures that the execution flow of secure kernels 109 and regular programs 108 only follows intended code paths, consisting of one or more telemetry probes 110 during runtime.

The method of analyzing the mathematical invariants to determine whether the TEFTI security property 106 of computer platform 101 is satisfied comprises encoding the TEFTI security property 106 into computer-assisted theorem provers 107. This system can then analyze the mathematical invariants to determine if the TEFTI security property 106 is satisfied. Upon a determination that the TEFTI security property 106 is not satisfied, the mathematical invariants are analyzed to generate a counterexample that shows the areas on which TEFTI security property 106 does not hold which can then be amended accordingly at system design time so that the TEFTI security property 106 is satisfied.

Once the TEFTI security property 106 is satisfied in the mathematical model 105, the TEFTI security property 106 is embedded at source-code level or binary level within secure kernels 109 and regular programs 108 and enforced by one or more secure kernels 109 at runtime in their corresponding memory address space 102.

System 100 further comprises a secure memory region in each memory address space 102 to store the telemetry probe data 111 in an append-only fashion. This ensures that any telemetry probe data 111 collected from the computer platform 101 is stored securely and tamper-proof. One or more secure kernels 109 transmit the probe-data append-only log for their respective memory address space 102 periodically using a platform signing agent to a program executing on the local computer platform 101 or to a remote machine. This ensures that any telemetry probe data 111 collected from the computer platform 101 is transmitted securely and in real-time.

In addition, system 100 includes a mechanism for mapping unforgeable telemetry probe data 111 sent from a commodity computer system into corresponding cybersecurity regulatory controls. Specifically, the probe-data is classified into specific cybersecurity regulatory control levels, which are obtained from standard cybersecurity compliance frameworks related to industry and government sectors.

Some embodiments of system 100 offer a robust solution for providing unforgeable telemetry in the presence of cyberattacks on computer platform 101. By implanting immutable telemetry probes 110 on secure-kernel programs 109, analyzing mathematical invariants using computer-assisted theorem proving systems, and ensuring data is stored securely in append-only logs transmitted in real-time, this system provides unparalleled protection against tampering and ensures that cybersecurity regulatory controls are met. The unique combination of design-time mathematical modeling, runtime enforcement of telemetry probes 110, and secure telemetry probe data 111 transmission makes it a valuable tool for industries and governments seeking to monitor and safeguard their systems from cyber threats.

Advantages over traditional methods of telemetry on computer platforms include:
1. Immutable Telemetry probes: The telemetry provisioning mechanism implants immutable telemetry probes on secure kernels and regular programs. This ensures that any telemetry for purposes of detecting cyber-attacks, monitoring or data-flow analysis cannot be modified maliciously or inadvertently regardless of security flaws in the computer platform.
2. Telemetry Execution Flow and Trigger Integrity (TEFTI): The TEFTI security property ensures that the execution flow of secure kernels and regular programs only follows intended code paths, consisting of one or more telemetry probes during runtime. This ensures that any telemetry for purposes of detecting cyber-attacks, monitoring or data-flow analysis are always triggered on any execution flow paths.
3. Append-only Probe Log: The system comprises a secure memory region in each memory address space to store the telemetry probe data in an append-only fashion, ensuring that any telemetry probe data collected from the computer platform is stored securely and tamper-proof. This feature ensures that any telemetry probe data collected from the computer platform is stored in a way that prevents it from being deleted or altered by malicious actors.
4. Mapping to Cybersecurity regulatory controls: The system includes a mechanism for mapping unforgeable telemetry probe data sent from a computer platform into corresponding cybersecurity regulatory controls, ensuring that any potential security incidents are reported and addressed in compliance with relevant cybersecurity regulations. This feature ensures that any potential security incidents on the computer platform are reported and addressed in compliance with relevant regulations, reducing the risk of non-compliance and associated fines.

FIGS. 1-9 show diagrams for some embodiments of the systems and methods described herein. For purposes of discussion each of the diagrams is referred to as a system, however, it should be appreciated that discussed systems may also be implemented through corresponding methods. Some embodiments of the disclosed diagrams (whether through systems or methods) may not include all of the blocks shown in the corresponding diagram, or may include other blocks/steps not represented in the diagrams.

Each of the diagrams include blocks (e.g., blocks 101 and 102 in FIG. 1) and connecting lines (e.g., connecting line 151 in FIG. 1). Each block may represent, for example, stored information (e.g., a definition for a peripheral), an aspect of a method (e.g., a method step), or a module of the corresponding system. A module comprises the hardware and/or software, to implement a defined capability (e.g., the corresponding method step). For example, such a capability may be implemented through a module having one or more processors executing computer code stored on one or more non-transitory computer-readable storage medium. In some embodiments, a capability is implemented at least in part through a module having dedicated hardware (e.g., an ASIC, an FPGA). In some embodiments modules may share components. For example, a first function module and a second function module may both utilize a common processor (e.g., through time-share or multithreading) or have computer executable code stored on a common computer storage medium (e.g., at different memory locations). In some instances, a module may be identified as a hardware module or a software module. A hardware module includes or shares the hardware for implementing the capability of the module. A hardware module may include software, that is, it may include a software module. A software module comprises information that may be stored, for example, on a non-transitory computer-readable storage medium. In some embodiments, the information may comprise instructions executable by one or more processors. In some embodiments, the information may be used at least in part to configure hardware such as an FPGA. The capability of a software module may be implemented, for example, by reading the software module from a storage medium and executing it with one or more processors, or by reading the software module from a storage medium and using the information to configure hardware.

The relationship between blocks is illustrated by connecting lines. The termination of a connecting line indicates whether there may be multiple instances of a block present in the illustrated embodiment. Specifically, the symbol 002 (FIG. 1) indicates that the connection is to a single functional block while the symbol 003 indicates that the connection may be to multiple functional blocks. For example, connecting line 155 connects a single mathematical model 105 to one or more devices 103. Unless explicitly stated otherwise, a connection with the symbol 002 is the starting point of the flow while the symbol 003 is the ending point of the flow for a given connecting line. For example, the flow of connecting line 155 is from the mathematical model 105 to the devices 103. For some connecting lines, the starting point of the flow is indicated via a shaded circle symbol 001. For example, connecting line 165 connects telemetry probes 110 to telemetry probe data 111 and is read as one or more telemetry probes 110 generates one or more telemetry probe data 111.

Solid connecting lines such as connection line 151 represent flow, interaction and dependency between various functional blocks.

There are several types of connection lines. A "contains" connecting line (e.g., connecting line 151, FIG. 1) indicates that one component or element is enclosed within or comprised by another component or element. A "specified-in" connecting line (e.g., connecting line 154, FIG. 1) indicates that a particular component, or configuration is defined or detailed in a specific mathematical model 105 or database. A "defines" connecting line (e.g., connecting line 157, FIG. 1) indicates that one component or element provides a definition or explanation for another component or element, such as a mathematical model 105 defining an invariant. A "manifests-as" connecting line (e.g., connecting line 159, FIG. 1) indicates that a particular component or element is exhibited or expressed in a specific form or manner, such as a program, a user interface or a data visualization. A "proven-in" connecting line (e.g., connecting line 160, FIG. 1) indicates that a particular claim, hypothesis, or statement has been verified or validated through testing, experimentation, or theorem proving. An "embedded-within" connecting line (e.g., connecting line 162, FIG. 1) indicates that one component or element is integrated or embedded within another component or element, such as a software library or a hardware module. A "generates" connecting line (e.g., connecting line 165, FIG. 1) indicates that one component or element produces or creates another component or element, such as data, output, or a byproduct. A "maps-to" connecting line (e.g., connecting line 166, FIG. 1) indicates that one component or element corresponds to or is associated with another component or element, such as a mapping between two datasets or domains. A "visualized" connecting line (e.g., connecting line 167, FIG. 1) indicates that data or information is presented in a graphical or visual format, making it easier to understand or interpret. A "stored-using" connecting line (e.g., connecting line 168, FIG. 1) indicates that data or information is retained or preserved using a specific storage mechanism, such as a database, file system, or memory architecture.

A "monitors" connecting line (e.g., connecting line 251, FIG. 2) indicates that one component observes or tracks the behavior of another component in real-time. A "logs" connecting line (e.g., connecting line 252, FIG. 2) indicates that data is recorded or stored for later analysis or processing. A "detects" connecting line (e.g., connecting line 253, FIG. 2) indicates that one component identifies or recognizes specific patterns or anomalies in the behavior of another component. A "collects" connecting line (e.g., connecting line 254, FIG. 2) indicates that data is gathered or aggregated from various sources. An "exhibits" connecting line (e.g., connecting line 259, FIG. 2) indicates that a component displays or presents certain characteristics or behaviors. A "source-embedded" connecting line (e.g., connecting line 255, FIG. 2) indicates that one component is integrated or embedded directly into the source code of another component. A "binary-embedded" connecting line (e.g., connecting line 256, FIG. 2) indicates that one component is inserted or embedded into the binary code of another component. A "service-calls" connecting line (e.g., connecting line 257, FIG. 2) indicates that one component invokes or requests services from another component to perform specific actions. A "resides-in" connecting line (e.g., connecting line 258, FIG. 2) indicates that a component is located or operates within a specific environment or space, such as a memory address space 102 or a secure enclave.

A "protect" connecting line (e.g., connecting line 355, FIG. 3) indicates that a component or data is shielded from unauthorized access, modification, or tampering. A "references" connecting line (e.g., connecting line 364, FIG. 3) indicates that one component or data point is linked to or associated with another component or data point for verification, validation, or integrity checking purposes.

An "uses" connecting line (e.g., connecting line 651, FIG. 6) indicates that a component utilizes or relies on another component or service to perform its functions. An "applies-to" connecting line (e.g., connecting line 652, FIG. 6) indicates that a policy, rule, or configuration is relevant or applicable to a specific component or system. A "write-protects-code" connecting line (e.g., connecting line 653, FIG. 6) indicates that a mechanism prevents modification or tampering with code or data in a specific region of memory. An "isolates" connecting line (e.g., connecting line 656, FIG. 6) indicates that a component or system is separated or segregated from other components or systems to prevent unauthorized access or interference. A "loaded-by" connecting line (e.g., connecting line 660, FIG. 6) indicates that a component or module is loaded or initialized by another component or system. A "loads" connecting line (e.g., connecting line 662, FIG. 6) indicates that a component or system initializes or loads another component or module into memory. A "signs" connecting line (e.g., connecting line 663, FIG. 6) indicates that a component or system generates a digital signature or authentication token to verify the integrity or authenticity of data or code. A "transmits" connecting line (e.g., connecting line 665, FIG. 6) indicates that data or information is sent or communicated from one component or system to another. A "logs" connecting line (e.g., connecting line 666, FIG. 6) indicates that data or events are recorded or stored for auditing, debugging, or analytical purposes.

An "append-only" connecting line (e.g., connecting line 854, FIG. 8) indicates that data can only be added to a storage location in a sequential manner, without modifying or deleting existing data. A "written-to" connecting line (e.g., connecting line 856, FIG. 8) indicates that data is stored or recorded in a specific location, such as a file or database. A "secure-transmission" connecting line (e.g., connecting line 857, FIG. 8) indicates that data is transmitted from one component to another using a secure protocol or mechanism, such as encryption or authentication. A "within" connecting line (e.g., connecting line 859, FIG. 8) indicates that a component or process operates inside or is contained within a specific boundary or environment, such as a trusted execution environment, storage media, or a secure container.

A "generated-by" connecting line (e.g., connecting line 951, FIG. 9) indicates that data or a signal is produced or created by a specific component or process. A "maps" connecting line (e.g., connecting line 954, FIG. 9) indicates that a relationship or correspondence is established between two or more components, data structures, or concepts. An "assigns" connecting line (e.g., connecting line 956, FIG. 9) indicates that a value, label, or attribute is allocated or associated with a specific component, data element, or entity. An "identifies" connecting line (e.g., connecting line 968, FIG. 9) indicates that a component or process recognizes or determines the characteristics, properties, or identity of an object, event, or data element. A "generates-data" connecting line (e.g., connecting line 967, FIG. 9) indicates that a component or process produces or creates new data, such as telemetry information, logs, or metrics. An "analyzes" connecting line (e.g., connecting line 966, FIG. 9) indicates that a component or process examines, interprets, or evaluates data to extract insights, patterns, or meaningful information. An "applies" connecting line (e.g., connecting line 971, FIG. 9) indicates that a component or process uses the function and/or results of another component to carry out part of its functionality.

FIG. 1 shows a diagram of a system 100 for unforgeable telemetry in the presence of cyber-attacks on a computer platform.

In system 100, computer platform 101 contains (see connecting line 151) one or more memory address spaces 102, one or more devices 103 (see connecting line 152), and one or more programs 104 (see connecting line 153). One or more memory address spaces 102 are specified in (see connecting line 154) mathematical model 105. One or more devices 103 are specified in (see connecting line 155) mathematical model 105. One or more programs 104 are specified in (see connecting line 156) mathematical model 105. Each program among programs 104 manifests as (see connecting line 158) a regular program among regular programs 108 or (see connecting line 159) a secure-kernel program among secure kernel programs 109. Mathematical model 105 defines (see connecting line 157) TEFTFI security property 106. TEFTI Security Property 106 is proven in (see connecting line 160) theorem provers 107. TEFTI Security Property 106 is embedded within (see connecting line 161) on or more regular programs 108 or and is embedded within (see connecting line 162) one or more secure-kernel programs 109. One or more regular programs 108 contains (see connecting line 163) one or more telemetry probes 110. One or more secure-kernel programs 109 contains (see connecting line 163) one or more telemetry probes 110. One or more telemetry probes 110 generates (see connecting line 165) one or more telemetry probe data 111. Telemetry probe data 111 maps to (see connecting line 166) a probe data mapping 112. Telemetry probe data 111 is visualized by (see connecting line 167) a probe data representation 113. Telemetry probe data 111 is stored using (see connecting line 168) probe data storage 114.

Some embodiments of system 100 employ immutable telemetry probes 110 that collect specific types of information from programs 104 which can either be secure-kernel programs 109 or regular programs 108 in a given memory address space 102. These probes are embedded into source-code or binary code and securely store their collected data via a secure kernel service call at the probe memory address space 102.

System 100 may ensure that telemetry probe programming instructions embedded within the execution flow of the secure kernel programs 109 and regular programs 108 cannot be modified or altered after they have been loaded into memory. System 100 ensures integrity of the telemetry probes via the TEFTI Security Property 106 by implementing read-only memory protections for code regions, securing program stacks and indirect calling mechanisms, validating branch and jump targets, aligning them correctly, protecting stack frames, and verifying indirect call targets against function-defined type hashes, system 100 may preserve authenticity and integrity of telemetry probe code.

System 100 may employ secure-kernel programs 109, which is operating at a high privilege level within computer platform 101, that is responsible for loading and managing regular programs 108 or other secure kernels 109 while ensuring the integrity and authenticity of telemetry probes 110 and probe data, in different memory address space 102 of computer platform 101 even in the presence of sophisticated cyberattacks including those that make use of devices 103 to carry out direct memory attacks. Devices 103 may also be referred to as peripherals of computer platform 101.

System 100 may employ a signing agent to establish the authenticity of telemetry probe data 111, utilizing cryptographic mechanisms such as hash functions and digital signatures to verify the integrity and origin of the data. The signed probe data is then stored on non-volatile storage media such as telemetry probe data storage 114 within the local computer platform 101 or remote machine, ensuring that it remains retained and can be retrieved as needed even in the event of system restarts or power failures.

System 100 may employ a probe data mapping process 112 for mapping telemetry probe data 111 to create a one-to-one correspondence between specific data points collected from various sources within system 100 and a corresponding set of metadata that describes each data point's relevance, importance, and context. The mapped telemetry probe data 111 may then be represented via telemetry probe data representation 113. In some embodiments, telemetry probe data representation 113 is in a format selected from the group consisting of textual information, graphical user interface, or raw binary data, with an alerting mechanism notifying users or security personnel when specific thresholds or criteria are met based on the mapped probe data.

Telemetry Probes 110

The increasing reliance of modern computing systems on software-based components has created a pressing need for effective methods to monitor program behavior including data flows as well as detect and prevent cyberattacks. As a result, the development of system-level solutions that can provide unforgeable telemetry data in real-time is crucial for ensuring the security and integrity of computer platform 101. Some embodiments address this need by providing a novel approach to collecting and logging telemetry data from secure-kernel programs 109 and regular programs 108 on a given memory address space 102.

Figure 2:
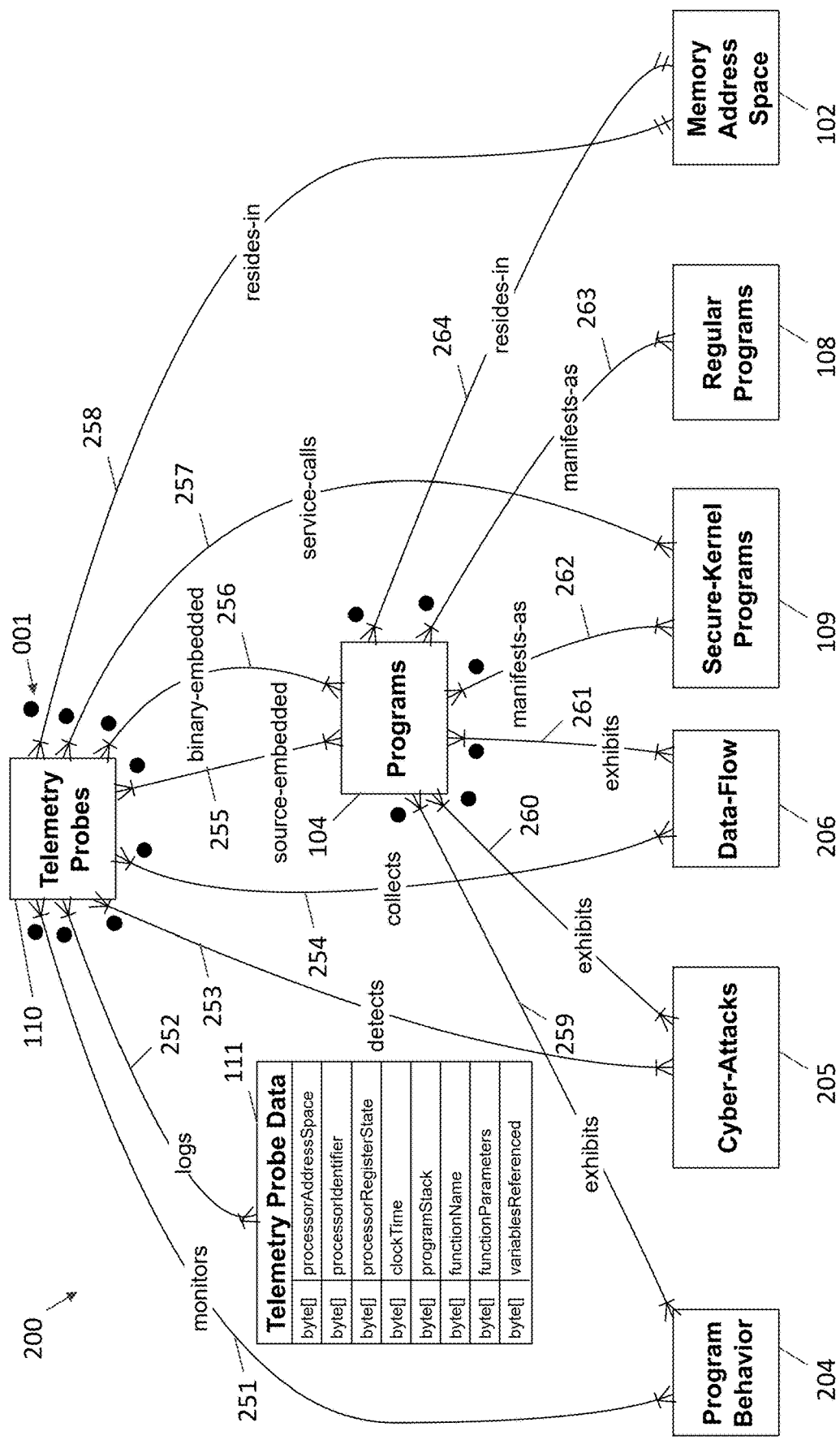
FIG. 2 shows a system 200 for using telemetry probes to monitor program behavior and log telemetry data via a secure kernel service call in various memory address spaces with mechanisms to modify source-code or binary code for probe placement, according to some embodiments.

FIG. 2 shows a system 200 for using telemetry probes 110 to monitor program behavior 204 and log telemetry probe data 111 via a secure kernel service call in various memory address spaces 102 with mechanisms to modify source-code or binary code for probe placement. In some embodiments, system 200 may be a subsystem within system 100.

System 200 and associated methods involve placing one or more immutable telemetry probes 110 within the code of secure-kernel programs 109 and regular programs 108 in a given memory address space 102 are now described in connection with FIG. 2.

In system 200, telemetry probes 110 monitor (see connecting line 251) one or more program behaviors 204. Telemetry probes 110 log (see connecting line 252) telemetry probe data 111. Telemetry probes 110 detect (see connecting line 253) one or more cyberattacks 205. Telemetry probes 110 collect (see connecting line 254) one or more data flows 206. Telemetry probes 110 are source embedded into (see connecting line 255) one or more programs 104. Telemetry probes 110 are binary embedded into (see connecting line 256) one or more programs 104. Telemetry probes 110 make serv-ce calls to (see connecting line 257) one or more secure-kernel programs 109. Telemetry probes 110 reside in (see connecting line 258) memory address space 102. Programs 104 exhibit (see connecting line 259) program behavior 204. Programs 104 exhibit (see connecting line 260) cyberattacks 205. Programs 104 exhibit (see connecting line 261) data flow 206. Programs 104 manifests as (see connecting line 262) secure-kernel programs 109. Programs 104 manifests as (see connecting line 263) regular programs 109. Programs 104 reside in (see connecting line 264) memory address space 102.

Telemetry probes 110 collect telemetry probe data 111 which are specific types of information, including processor address space and identifier, processor register state at the time the probe was invoked, contents of the program stack (including back traces), function name and formal parameters, associated memory for functions such as global variables referenced by programs 104, and other data relevant to monitoring program behavior and detecting and preventing cyberattacks.

To facilitate the placement of telemetry probes 110 within secure-kernel programs 109 and regular programs 108, the system employs mechanisms that modify source-code or binary code. Telemetry probe 110 can be embedded into the code using one or more processor instructions that access specific memory regions in a given memory address space 102. In some other embodiments the telemetry probe is placed by modifying binary code using binary rewriting techniques.

System 200 further enables the logging of telemetry probe data 111 via a secure kernel service call at the probe memory address space 102. This approach ensures that the collected data is securely stored and protected from tampering or alteration. Moreover, the use of immutable telemetry probes 110 guarantees that the telemetry probe will always be triggered during runtime and collected data cannot be forged or modified in any way.

In addition to collecting telemetry probe data 111, system 200 also allows for the arrangement of telemetry probes 110 within and across secure-kernel programs 109 and regular programs 108 at different privilege levels on computer platform 101. This includes placing probes within and across one or more memory address spaces 102 to monitor various aspects of program behavior 204. Specifically, telemetry probes 110 can be used to signify cyber-attacks 205 on one or more programs 104, collect information about data-flow 206 between programs, or simply monitor the execution of individual programs.

Data-flow 206 telemetry involves capturing and recording detailed information about the flow of data within computer platform 101 (FIG. 1), providing a comprehensive view of how data is being accessed, processed, and transmitted in real time. By integrating telemetry with data-flow logging, organizations can gain valuable insights into their data usage patterns, detect potential security threats, and ensure compliance with regulatory requirements through the collection and analysis of log data from various sources, including devices 103 and programs 104.

By providing an effective means for collecting unforgeable telemetry probe data 111 from secure-kernel programs 109 and regular programs 108 on computer platform 101, system 100 offers significant benefits in terms of improving system security and integrity. The ability to detect cyberattacks 205 and analyze program behavior 204 in real time enables more accurate threat detection and prevention strategies to be implemented.

Telemetry Execution Flow and Trigger Integrity (TEFTI) Security Property 106

Figure 3:
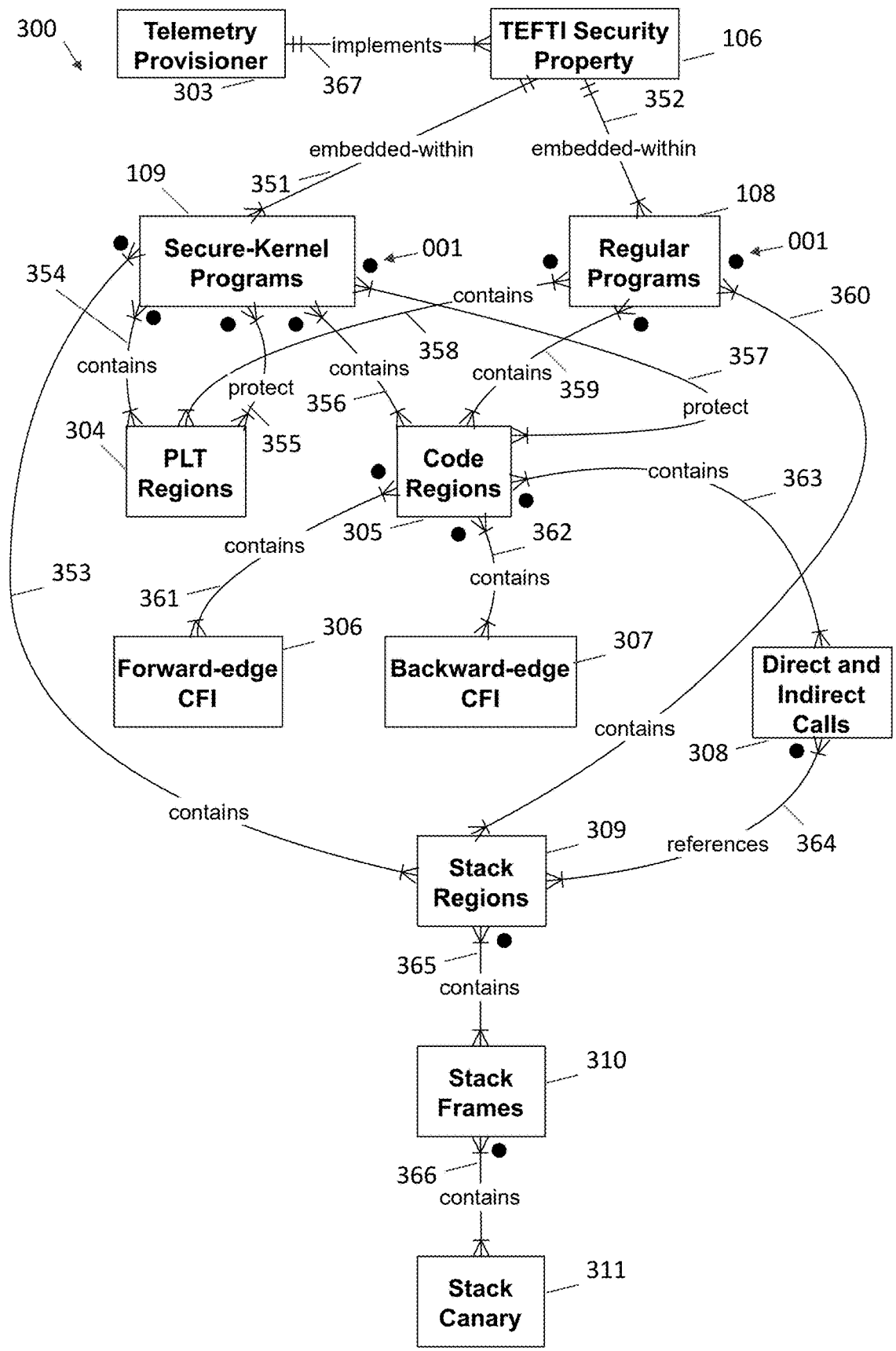
FIG. 3 shows a system 300 for using Telemetry Execution Flow and Trigger Integrity (TEFTI) security property to ensure that the telemetry probe programming instructions embedded within the execution flow of the secure kernel programs and regular programs cannot be modified or altered after they have been loaded into memory, according to some embodiments.

FIG. 3 shows a system 300 that uses a Telemetry Provisioner 303 to implement TEFTI security property 106 to ensure that the telemetry probe 110 programming instructions embedded within the execution flow of the secure kernel programs 109 and regular programs 108 cannot be modified or altered after they have been loaded into a memory address space 102. This approach ensures that the telemetry probe code remains unchanged, preventing accidental or malicious modifications that could compromise TEFTI security property 106. In some embodiments, system 300 may be a subsystem within system 100.

In system 300, the Telemetry Provisioner 303 implements (see connecting line 367) the TEFTI security property 106 which is embedded within (see connecting line 351) one or more secure kernel programs 109. The TEFTI security property 106 is also embedded within (see connecting line 352) one or more regular programs 108. Secure kernel programs 109 contains (see connecting line 354) one or more Procedure Linkage Table (PLT) regions 304 and also contains (see connecting line 356) one or more code regions 305. Regular programs 108 contains (see connecting line 358) one or more PLT regions 304 and also contains (see connecting line 359) one or more code regions 305. Secure kernel programs 109 protect (see connecting line 355) the PLT regions 304 and also protect (see connecting line 357) the code regions 305 of both secure kernel programs 109 and regular programs 108. Code regions 305 of secure kernel programs 109 and regular programs 108 contains (see connecting line 361) Forward-edge Control Flow Integrity (CFI) 306, contains (see connecting line 362) Backward-edge CFI 307, and contains (see connecting line 363) direct and indirect calls 308 to functions. Both secure kernel programs 109 and regular programs 108 contains (see connecting lines 353 and 360 respectively) stack regions 309. The direct and indirect calls 308 references (see connecting line 364) the aforementioned stack regions 309. The stack regions 309 contains (see connecting line 365) stack frames 310 which further contains (see connecting line 366) stack canary 311.

Figure 6:
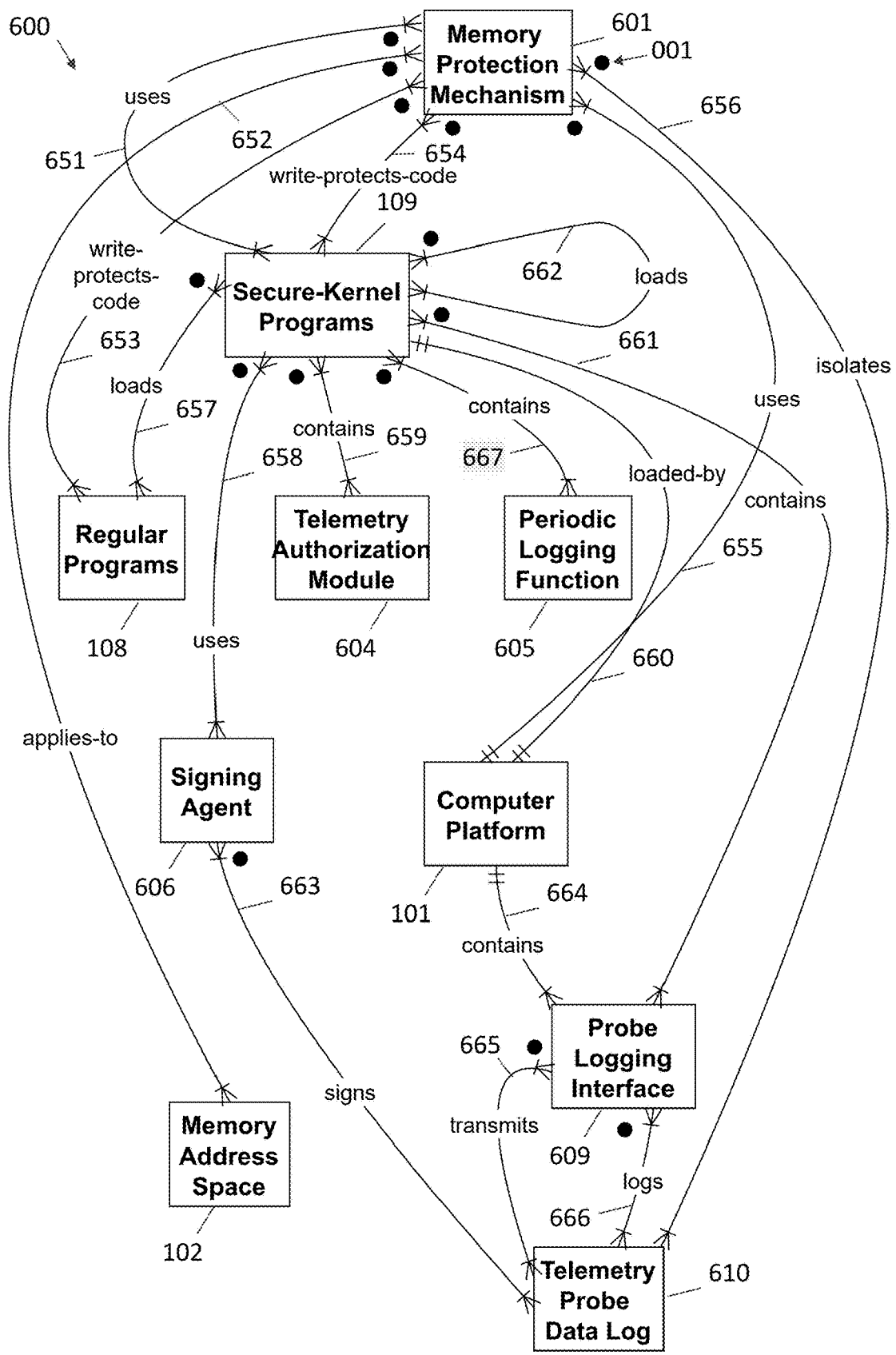
FIG. 6 shows a secure kernel architecture 600, according to some embodiments.
Figure 7:
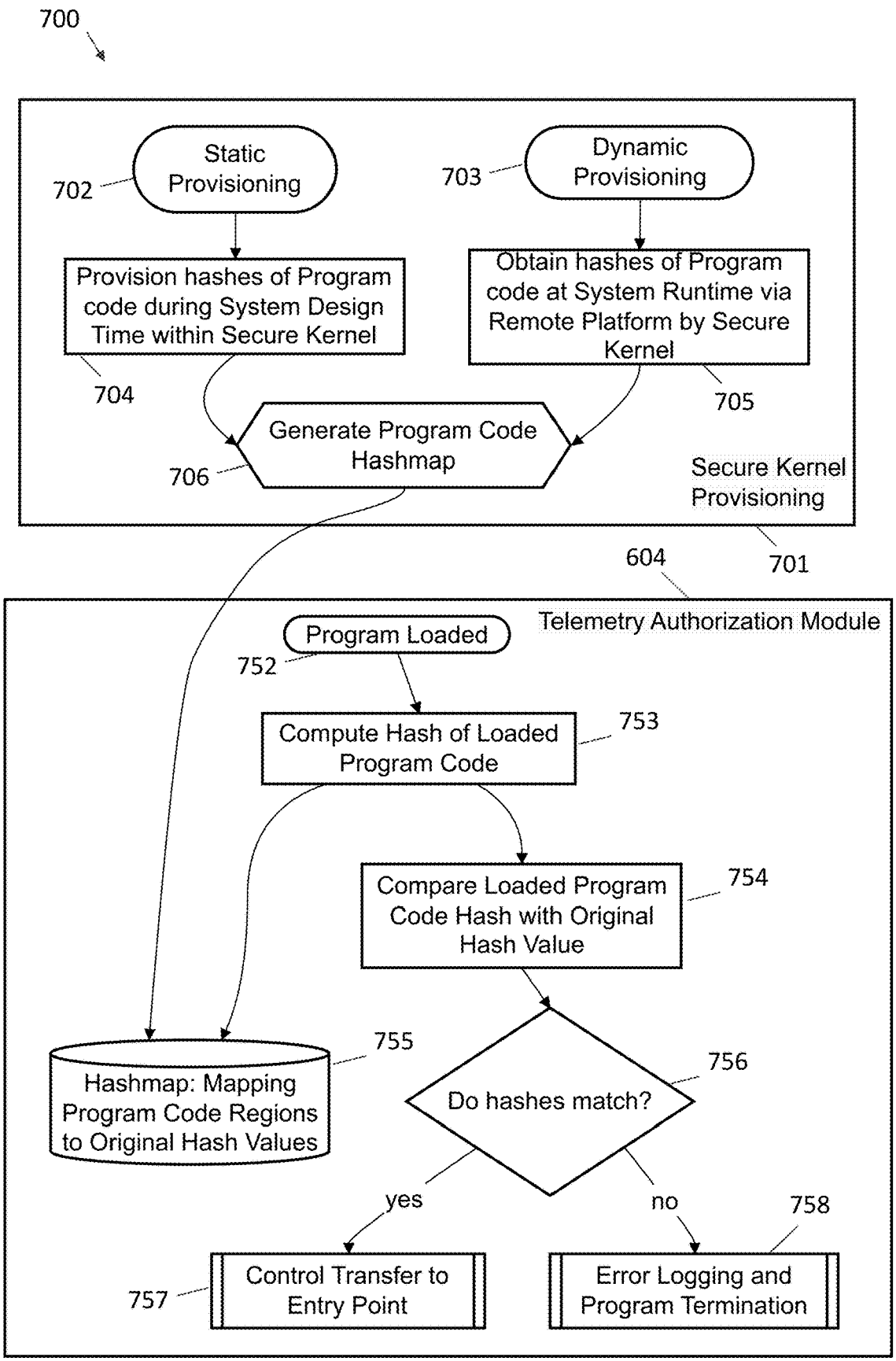
FIG. 7 shows a secure kernel telemetry probe authorization module, according to some embodiments.

System 300 may ensure that secure kernel programs 109 and regular programs 108 cannot be modified or altered after they have been are loaded into memory, by performing a telemetry integrity check comprising computing the hash of the telemetry probe code and comparing it with the stored code hashes of the program (discussed further in connection with method 700 shown in FIG. 7). If the comparison is unsuccessful an error is logged in the telemetry probe log and the program is not loaded. If the hash comparison is successful, then the program code regions 305 are marked read-only. This is accomplished through the use of memory protection mechanisms 601 (FIG. 6).

In some embodiments, memory protection mechanisms 601 are implemented using hardware capabilities and platform memory management unit (MMU) and IO Memory Management Unit (IO MMU) configuration. Specifically, hardware capabilities employed by secure kernel programs 109 at the same or higher privilege level and at the same or different memory address space 102 to set code regions 305 as read-only from other programs and hardware devices 103.

In another embodiment software based verification and/or software fault isolation is enforced within the secure kernel programs 109 and regular programs 108 source code or binary code to set code memory regions as read-only from other programs and hardware devices 103. This is achieved via software source code modifications and/or binary rewriting techniques.

Furthermore, the procedure linkage table (PLT) regions 304 of the secure kernel programs 109 and regular programs 108 is also memory-protected to be read-only. PLT region 304 is a data region in programs 104 (FIGS. 1 and 2) that contains information about the procedures or functions that can be called by the program. From a security perspective, PLT regions 304 are crucial because they provide a potential attack vector for malicious code injection and hijacking of control flow. If an attacker can modify PLT region 304 to point to malicious code, they can execute arbitrary instructions within the compromised process, potentially subverting telemetry probes 110 and their resulting telemetry probe data log 610.

System 100 may utilize either hardware mechanisms that operate at the same or higher privilege level and may be situated in the same or different memory address space 102 to set PLT regions 304 as read-only for other programs 104 and devices 103, effectively enforcing a strict access control regime; or software-based verification and/or fault isolation techniques embedded within the source code or binary code of both the secure kernel programs 109 and regular programs 108, which similarly restricts access to PLT region 304 as read-only from other executing programs and hardware components.

By implementing these memory protection mechanisms 601 for code regions 305 (containing telemetry probes 110) for both secure kernel programs 109 and regular programs 108 including the PLT regions 304 of programs system 100 may ensure that no modifications can be made to telemetry probes 110 once loaded into memory thereby ensuring the TEFTI security property 106.

In addition to implementing read-only memory protections for secure kernel and regular program code regions to preserve authenticity and integrity of telemetry probes, system 100 may also protect the program stack regions 309 and direct and indirect calls 308 to ensure that TEFTI security property 106 is preserved at all times during system runtime.

The program function call stack, or simply the stack regions 309, are regions of memory where function calls are stored during program execution. It's a Last-In-First-Out (LIFO) data structure that keeps track of the functions that have been called but not yet returned, allowing the program to properly manage its execution flow and prevent unexpected behavior. Program stack frames 310 refers to memory regions of the stack that stores information about a single function or method call within a program's execution stack, including parameters, local variables, and return addresses, providing a snapshot of the current state of the program's execution on a function or method call granularity.

Securing the stack regions 309 is crucial because it can be vulnerable to exploitation by malicious attackers through buffer overflow attacks, which involve overflowing a buffer with more data than it's designed to hold, potentially overwriting sensitive information or executing arbitrary code on the stack. This can lead to subversion of implanted telemetry probes 110 and the logging of the resultant probe data.

Program Indirect calls refer to function calls where the destination function's memory address is not directly specified, but rather retrieved from another location in memory, such as a table or an array of function pointers. This mechanism allows for dynamic dispatching and polymorphism in programming languages. However, indirect calls can also introduce security vulnerabilities if not properly secured. If an attacker can manipulate the contents of the target memory location, they may be able to redirect control flow to malicious code, leading to unauthorized execution of functions or even arbitrary code injection thereby subverting implanted telemetry probes 110. Securing indirect calls is crucial because it prevents attackers from hijacking program flow and executing malicious payloads that can attempt to avoid implanted telemetry probes 110 in the program code.

Some embodiments relate to a system for protecting programs against various types of stack and indirect call attacks that can compromise their execution flow integrity. The system ensures that programs execute safely and securely by preventing unauthorized control flow, modifying return addresses, or exploiting misaligned jumps by enforcing Forward-edge Control Flow Integrity (CFI) 306 and Backward-edge CFI 307. The system also includes protection of stack-frames 310 that prevents attackers from modifying the contents and layout of each stack frame. This is achieved by storing unique Stack Canary 311 values at predetermined locations within the stack frames, specifically at the beginning of the stack frames 310 before the memory location of the first local variable (FIG. 3).

Figure 4:
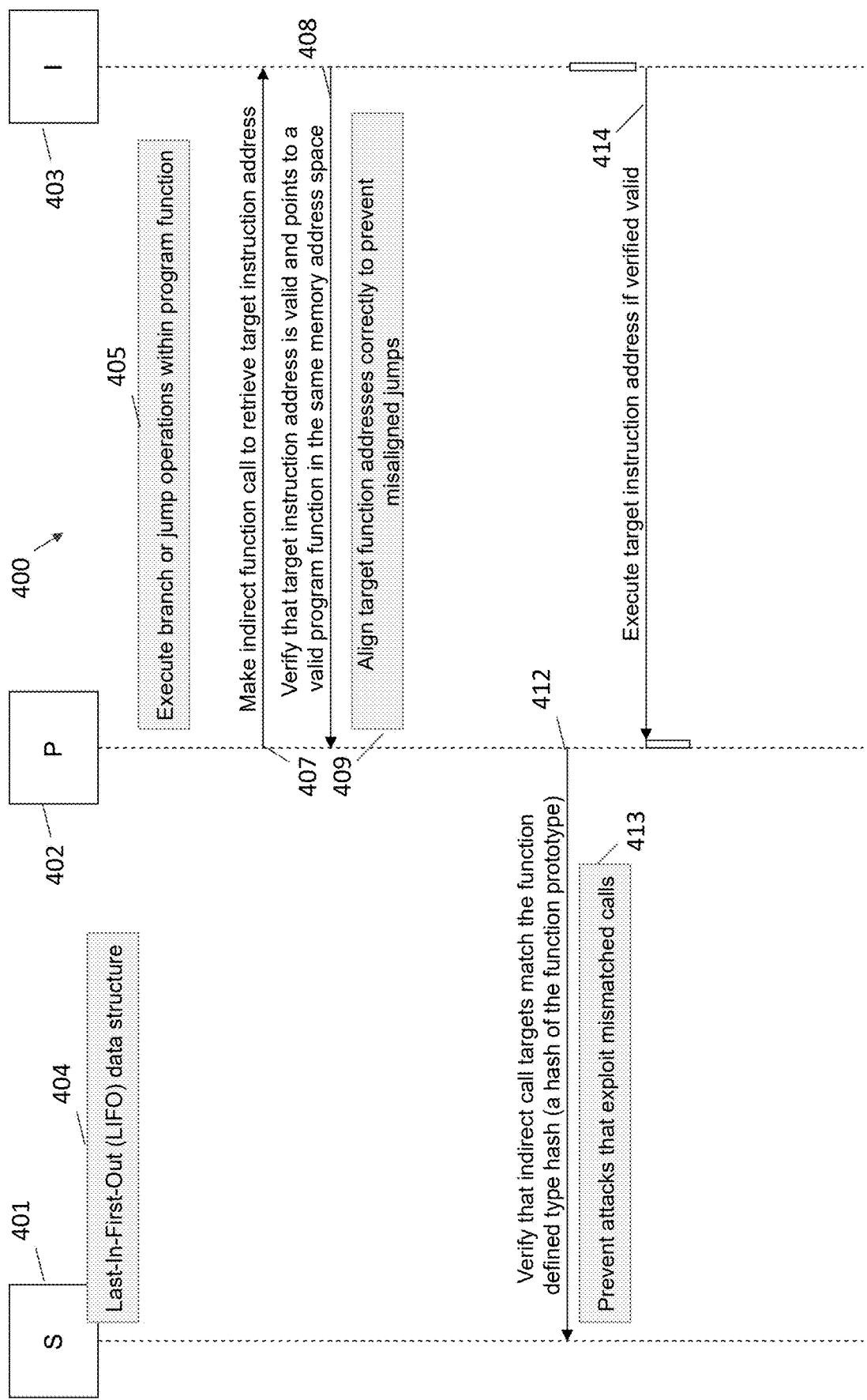
FIG. 4 show a time sequence diagram depicting a method 400 for TEFTI forward edge control follow integrity (CFI), according to some embodiments.

Some embodiments include a forward edge control flow integrity (CFI) protection mechanism 306 for program functions. FIG. 4 depicts a method 400 as a time sequence diagram according to some embodiments. In the time sequence diagram of FIG. 4, time flow increases from top to bottom. Here S 401 refers to the stack region 309, P 402 refers to programs 104 and I 403 refers to instructions executed by computer platform 101. As mentioned previously a Last-in-first-out (LIFO) data structure 404 is used for the stack region 309. Data structure 404 ensures that branch or jump operations within a program function point to valid locations in memory. When a branch or jump operation is executed 405, the system retrieves target instruction address at indirect function call 407 and validates whether the target instruction address is within the valid program memory range or points to a valid program function of an external program in the same memory address space 408. This scheme also aligns target function addresses correctly to prevent attackers from exploiting misaligned jumps 409 and verifies that indirect call targets match the function defined type hash (a hash of the function prototype) 412, preventing attacks that exploit mismatched calls 413. If the indirect call targets match the function defined type hash then the target instruction at the indirect call site is executed 414.

Figure 5A:
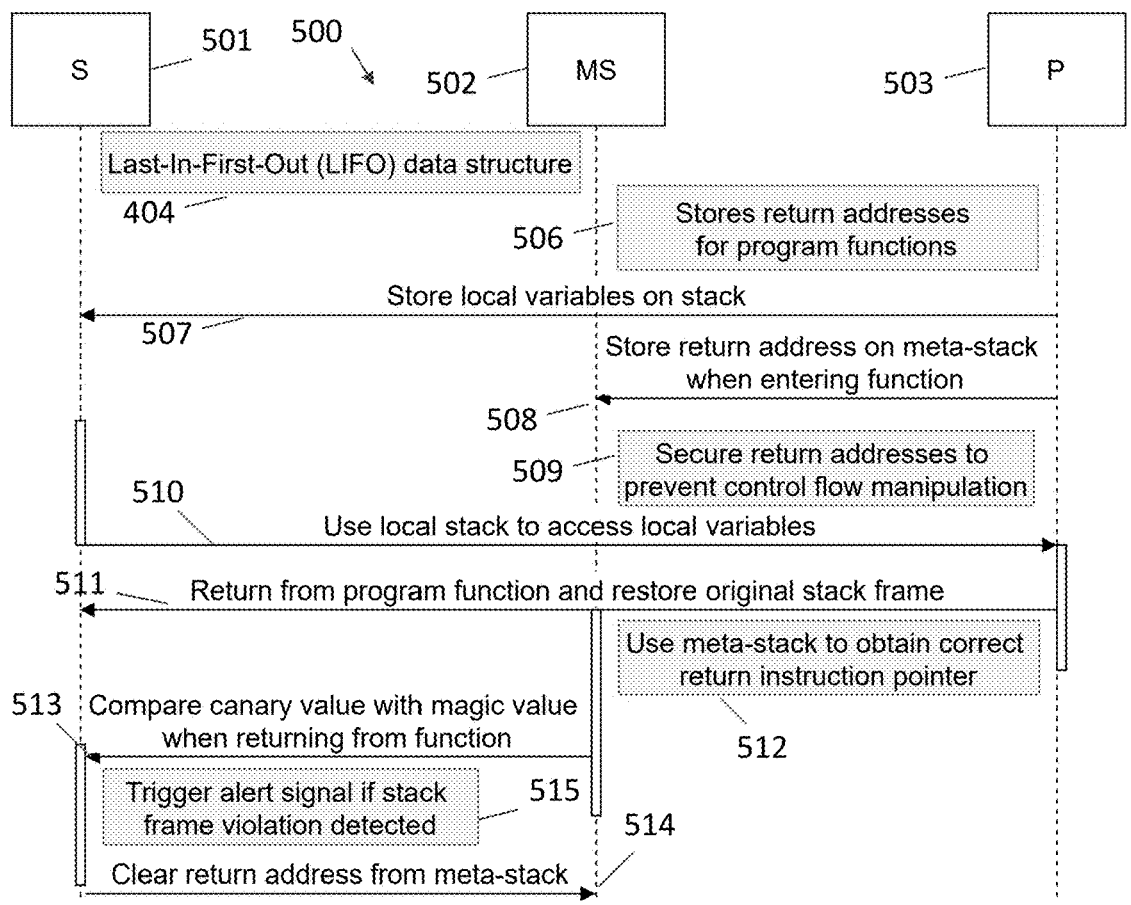
FIG. 5A shows a time sequence diagram depicting a method 500 for TEFTI backward edge CFI, according to some embodiments.

FIG. 5A shows a method 500 that uses a backward edge control flow integrity (CFI) protection mechanism 307 for program functions. This mechanism prevents attackers from modifying return addresses on the stack, ensuring that control flow returns to the correct location in the code.

In one embodiment the system achieves backward edge control flow integrity by introducing a meta-stack (MS) 502 mechanism, where every program P 503 function has a local stack region S 501 for storing local variables and a meta stack 502 for storing return addresses. As mentioned previously, a LIFO data structure 404 is used for the stack region 309. The meta-stack mechanism 502 works by storing return addresses for program functions 506 on meta-stack mechanism 502 and the local variables 507 on local stack region 501.

In some embodiments, when a program function is called, it stores its return address on the meta stack mechanism 502 (step 508). Upon return from the function, the system uses the meta stack to obtain the correct return instruction pointer 512 and returns from the program function to restore the original stack frame (step 511). The program function writes to local variables using the local stack (step 510).

The system includes a stack-frame protection mechanism that prevents attackers from modifying the contents and layout of each stack frame. This is achieved by storing unique Stack Canary 311 values at predetermined locations within the stack frames, specifically at the beginning of the stack frames 310 before the memory location of the first local variable (FIG. 3).

When a return instruction is executed in the program function, the system compares the canary value associated with the current stack frame to a predetermined magic value 513 stored in association with each Stack Canary value. If the compared values do not match, the system triggers an alert signal to log the stack frame violation 515. If the compared values match the system clears the return address from MS 502 and returns back to the caller.

Figure 5B:
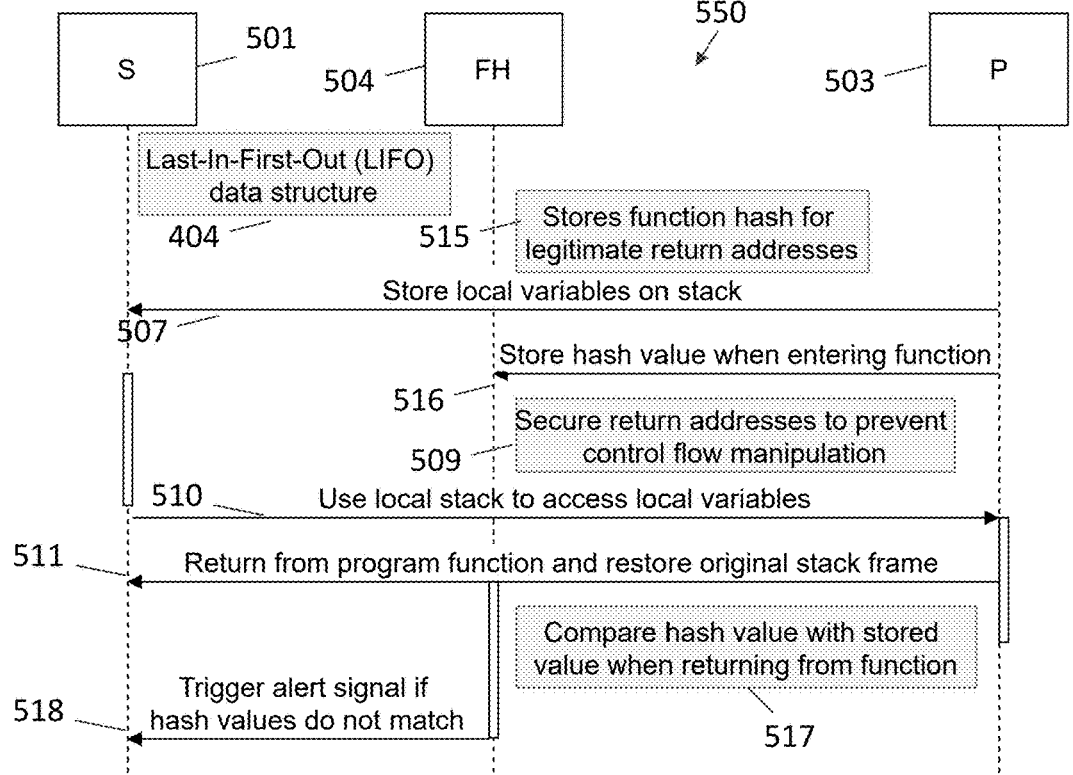
FIG. 5B shows a time sequence diagram depicting a method 550 for TEFTI backward edge CFI, according to some embodiments.

Another embodiment of the system is illustrated by method 550 shown in FIG. 5B which achieves backward edge control flow integrity 307 using function hashes 504. Every program 503 function has a local stack region 501 for storing local variables which is a LIFO data structure 404. The scheme stores function hashes for legitimate return addresses 515. Local variables are stored in the local stack 507 and accessed from there (step 510). The location of the return hash value is stored in the program 503 code regions 305 which secures return addresses to prevent control flow manipulation (step 509). When a function returns, the hash value at the return location in the code region is compared with the stored value on function entry 517. If there is a mismatch an alert is triggered (step 518). If the hash values match the original stack frame is restored and control is transferred back to the caller 511.

The aforementioned mechanisms of the present disclosure ensure that control flow is executed correctly within program source code or binary code and can be implemented using various techniques, including: (a) solely via hardware capabilities, (b) solely via software capabilities and (c) in a hybrid fashion that combines both hardware and software capabilities.

The system ensures that function execution flow integrity is enforced within the program's code, regardless of whether it's executed from source or compiled into binaries. This is achieved by validating branch or jump targets, aligning them correctly, protecting stack frames, and verifying indirect call targets against function-defined type hashes. By implementing these mechanisms, the present invention provides a robust and secure system for ensuring telemetry execution flow and trigger integrity by protecting programs against various types of attacks that can compromise their execution flow integrity.

FIG. 6 shows a secure kernel architecture 600, according to some embodiments. In some embodiments, system 600 may be a subsystem within system 100.

Memory protection mechanism 601 uses (see connecting line 651) and write-protects code in (see connecting line 654) secure-kernel programs 109, applies to (see connecting line 652) memory address space 102, write-protects code (see connecting line 653) of regular programs 108, uses (see connecting line 655) computer platform 101, and isolates (see connecting line 656) telemetry probe data log 610. Secure-kernel programs 109 loads (see connecting line 657) regular programs 108, uses (see connecting line 658) signing agent 606, contains (see connecting line 659) telemetry authorization modules 604, contains (see connecting line 667) periodic logging function 605, is loaded by (see connecting line 660) computer platform 101, and contains (see connecting line 661) probe logging interface 609. Additionally, secure-kernel programs 109 may load (see connecting line 662) other secure kernel-programs 109. Signing agent 606 signs (see connecting line 663) telemetry probe data log 610. Computer platform 101 contains (see connecting line 664) probe logging interface 609. Probe logging interface 609 logs (see connecting line 666) and transmits (see connecting line 665) telemetry probe data log 610.

Secure-kernel program 109 is a privileged kernel operating at a high privilege level within a computer platform 101. In some embodiments, the primary function of secure-kernel program 109 is to load and manage regular programs 108 or other secure-kernel programs 109, while ensuring the integrity and authenticity of its own operation through hardware validation during bootstrapping. In some embodiments, a feature of a secure kernel program is its ability to create a memory-protected telemetry probe data log 610 that is isolated from other programs 104 and devices 103 on system 100 (FIG. 1), using both hardware and software-based memory protection mechanisms 601 to prevent unauthorized access or tampering. A secure kernel program operates in any hardware operating mode supported by the underlying processor and utilizes services offered by other secure kernel programs running at higher privilege levels. Through a combination of periodic logging function 605, platform signing agent 606, and code write protection, a secure-kernel program provides a robust framework for ensuring the integrity and trustworthiness of telemetry probes 110 (FIG. 1), probe triggering and the logging of corresponding telemetry probe data 111, even in the presence of sophisticated cyberattacks.

In some embodiments, a memory-protected probe data log is created that is accessible only by the secure-kernel program. Hardware memory protections isolate the telemetry probe data log from other programs 104 and devices 103 on the computer platform 101, preventing unauthorized access or tampering. In some embodiments, such hardware memory protections can be achieved through the platform memory management Unit (MMU) for system memory protection and the IO Memory Management Unit (IO MMU) for system memory protection from devices 103.

In some embodiments, software-based verification and/or software fault isolation techniques are employed within the secure-kernel program to ensure that regular programs 108 do not compromise the integrity of the telemetry probes 110. The secure-kernel program uses hardware capabilities or software based verification to enforce read, write or execute memory protections from other programs and devices 103.

Secure kernel architecture 600 provides a probe logging interface 609 to the telemetry probes 110 implanted both in the secure-kernel programs 109 as well as regular programs 108. This interface allows for the addition of telemetry probe data 111 into the telemetry probe data log 610 in an append-only fashion. If invocation of interface 609 results in the probe data log 610 being full, it is transmitted to a local or remote machine.

In some embodiments, the secure kernel program operating in kernel mode leverages probe logging interface 609 provided by the underlying hardware directly whereas a secure kernel which manifests as a shared library in user mode may leverage logging interface supported by another secure-kernel program operating in kernel mode (a higher privileged mode).

A periodic logging function 605 executes via a periodic secure timer, transmitting the current contents of the probe data log 610 to a local or remote machine and resetting the probe data log 610 thereafter. In some embodiments, function 605 can be implemented in hardware or via software pre-emption.

The secure kernel program may use a signing agent 606 to establish the authenticity and trustworthiness of the telemetry probe data 111 transmitted to a local or remote machine. Signing agent 606 ensures that the probe data 111 is not tampered with or altered during transmission.

Every regular program 108 and secure kernel program 109 in the memory address space 102 is ensured to have its code write-protected using memory protection mechanisms, preventing unauthorized modifications.

Secure kernel instantiation happens at specific privilege levels and memory address spaces 102 within computer platform 101. These secure-kernel programs 109 load regular programs 108 or other secure-kernel programs 109 as needed into the same memory address space 102 and privilege level or a different memory address space 102 and privilege level, ensuring the integrity of system operations. The integrity of the first secure kernel loaded on the platform is validated by the computer platform hardware to ensure its authenticity. This secure kernel program operates in any hardware operating mode supported by the underlying processor and utilizes services offered by other secure-kernel programs running at higher privilege levels.

In some embodiments, the secure-kernel program can manifest as an entity at different layers of the operating system stack, each having distinct privilege levels and memory address spaces 102. For example, in x86 architecture: The hypervisor (Ring-1) can be a secure-kernel program that manages virtual machines and controls access to hardware resources.

In some embodiments of a computer platform that use an ARM architecture, the trusted execution environment (TEE) can be a secure-kernel program running at EL2 (Privilege Level 0), which provides a secure environment for sensitive operations. The firmware can also be a secure-kernel program, executing at EL3 (Privilege Level 1), which manages the computer platform's boot process and other low-level functions.

In some embodiments of a computer platform that use a RISC-V architecture the M-Mode (Machine Mode) is a secure-kernel program, having full control over the computer platform and its resources. The S-Mode (Supervisor Mode) may also be a secure-kernel program running at privilege level 1 and managing the computer platform's operations.

The secure-kernel program may be responsible for enforcing access controls, validating telemetry probe data 111 integrity, and ensuring the security and authenticity of telemetry probes 110.

FIG. 7 shows a secure kernel telemetry probe authorization module 604, according to some embodiments. In some embodiments, system 700 may be a subsystem within system 100. System 700 has a secure-kernel provisioning module 701 and telemetry authorization module 604.

Secure-kernel programs 109 can employ static provisioning 702 or dynamic provisioning 703 as shown in FIG. 7. With static provisioning 702 the hashes of secure-kernel programs 109 and regular programs 108 code are provisioned during system design time 704. With dynamic provisioning 703, hashes of the secure-kernel programs 109 and regular programs 108 are obtained at system runtime via a remote computer platform for instance 705. The hashes in both cases are then compiled at step 706 into a program code hashmap 755 which maps program code regions to original hash values.

A telemetry probe authorization module 604 validates the telemetry probes 110 of regular programs 108 and secure-kernel programs 109 loaded into memory from a storage medium. Module 604 has a hashmap 755 mapping program code regions to their original hash value and computes the hash of the program code loaded into memory 753 and then compares the loaded program code hash with the original hash value 754.

If, at step 756, the comparison succeeds, control is transferred to the entry point of the program (step 757); otherwise, an error is logged into the telemetry probe data log 610 and the program is terminated (step 758). Module 604 can be provisioned during system design time within the secure kernel program or obtained at system runtime via a remote platform by the secure kernel program.

Telemetry probes 110 may be modified at runtime by marking the code region of the telemetry probe read-write using memory protection mechanisms, changing the telemetry probe code at the target location with a telemetry probe code template, and then marking the code region of the telemetry probe read-only using memory protection mechanisms.

The secure-kernel program may verify the code region of the telemetry probe by comparing the hash of the telemetry probe code to the hash of the telemetry probe code template. A match signifies successful telemetry probe code modification, while a mismatch is logged as an error in the telemetry probe log.

Figure 8:
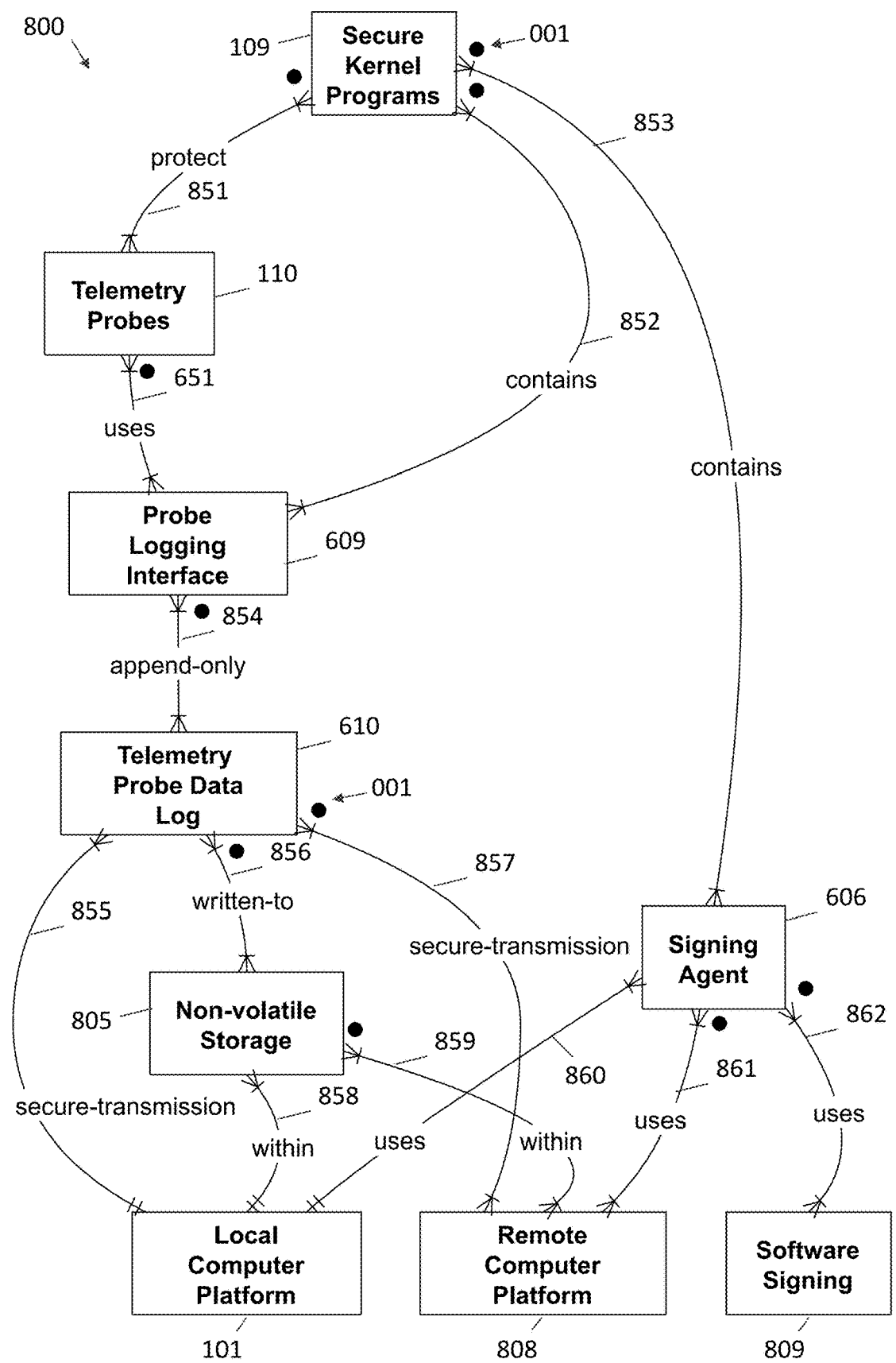
FIG. 8 shows a system 800 for telemetry probe data signing and storage, according to some embodiments.

FIG. 8 shows a system 800 for signing and storage of telemetry probe data, according to some embodiments. In some embodiments, system 800 may be a subsystem within system 100.

Secure-kernel program 109 protects (see connecting line 851) telemetry probes 110, contains (see connecting line 852) probe logging interface 609, and contains (see connecting line 853) signing agent 606. Telemetry probes 110 uses (see connecting line 651) probe logging interface 609. Probe logging interface logs, in an append-only fashion, (see connecting line 854) to telemetry probe data log 610. Telemetry probe data log 610 makes secure transmissions (see connecting lines 855 and 857) to local computer platform 807 and remote computer platform 808. Telemetry probe data log 610 may be written to (see connecting line 856) non-volatile storage 805. Non-volatile storage 805 may be within (see connecting lines 858 and 859) local computer platform 807 and/or remote computer platform 808. Signing agent 606 uses (see connecting lines 860, 861, and 862) local computer platform 807, remote computer platform 808, and signing software 809.

In a typical computing environment, the integrity and authenticity of telemetry data are crucial for making informed decisions about system behavior and performance. However, cyberattacks on computer platform 101 often compromise this data, leading to incorrect conclusions being drawn by security incident and event management (SIEM) tools and other monitoring systems. To address this issue, some embodiments provide systems and methods for unforgeable telemetry in the presence of cyberattacks on computer platform 101. Probe data signing and probe data storage 114, which ensures that telemetry data 111 remains authentic and tamper-proof even when an attacker attempts to manipulate or modify it.

Initially, telemetry probes 110 may be installed within the programs (both regular programs 108 and secure-kernel programs 109) running on computer platform 101. Probes 110 use secure kernel functionality within a given memory address space 102 to log telemetry probe data 111 on an append-only protected log within the secure kernel memory address space 102. This prevents attackers from modifying or deleting existing telemetry data 111, thereby maintaining its integrity and authenticity.

Once logged, probe data 111 can be transferred to another program in a local computer platform 101 or a remote computer platform 808. In some embodiments, the program probe data 111 is transferred to is a SIEM tool. To ensure that this transfer occurs securely and without tampering, in some embodiments the probe data is transferred using Secure Sockets Layer (SSL) or Transport Layer Security (TLS) encryption. This communication module can be implemented in software as part of the secure kernel program and/or implemented in computer platform hardware.

Signing agent 606 establishes the authenticity of the probe data 111 that is transmitted to local computer platform 807 and/or remote computer platform 808. Signing agent 606 uses software signing 809 to capture a digital signature of the running programs 104, secure kernel programs 109 and regular programs 108 using cryptographic mechanisms to ensure that any modifications or tampering with telemetry data 111 are detectable.

In some embodiments, signing agent 606 cryptographically establishes the authenticity of telemetry probe data 111 via a virtual trusted platform module (TPM) entirely realized in software. This approach utilizes cryptographic techniques, such as hash functions and digital signatures, to verify the integrity and origin of telemetry probe data 111. The virtual TPM module acts as a trusted authority, ensuring that any modifications or tampering with the probe data 111 can be detected.

In some embodiments, signing agent 606 leverages a physical hardware TPM, which provides a higher level of security and trustworthiness compared to a software-based solution. The physical TPM module is responsible for generating and storing cryptographic keys, as well as performing authentication and integrity checks on the probe data.

Signing agent 606 may also support an architecture where the authenticity of the probe data is established via a remote TPM residing on a remote computer platform 808 other than computer platform 101. This approach involves connecting to a remote computer platform that hosts a TPM, which verifies the integrity and origin of the probe data 111. The remote TPM acts as a trusted authority, ensuring that any modifications or tampering with the probe data 111 can be detected.

In addition to establishing authenticity, signing agent 606 may also include a mechanism for storing probe data 111 on non-volatile storage 805 media within a local computer platform 807 or a remote computer platform 808. This ensures that the telemetry probe data 111 is retained and can be retrieved as needed, even in the event of system restarts or power failures or in cases when an attacker attempts to delete or modify telemetry probe data 111.

In some embodiments, authentication and telemetry authorization module 604 within the secure kernels that uses a remote computer platform 808 key signing agent to authenticate and authorize access to the mapped probe data on the remote computer platform 808. This prevents unauthorized access to the telemetry probe data 111 and ensures that only authorized entities can view or manipulate it.

Figure 9:
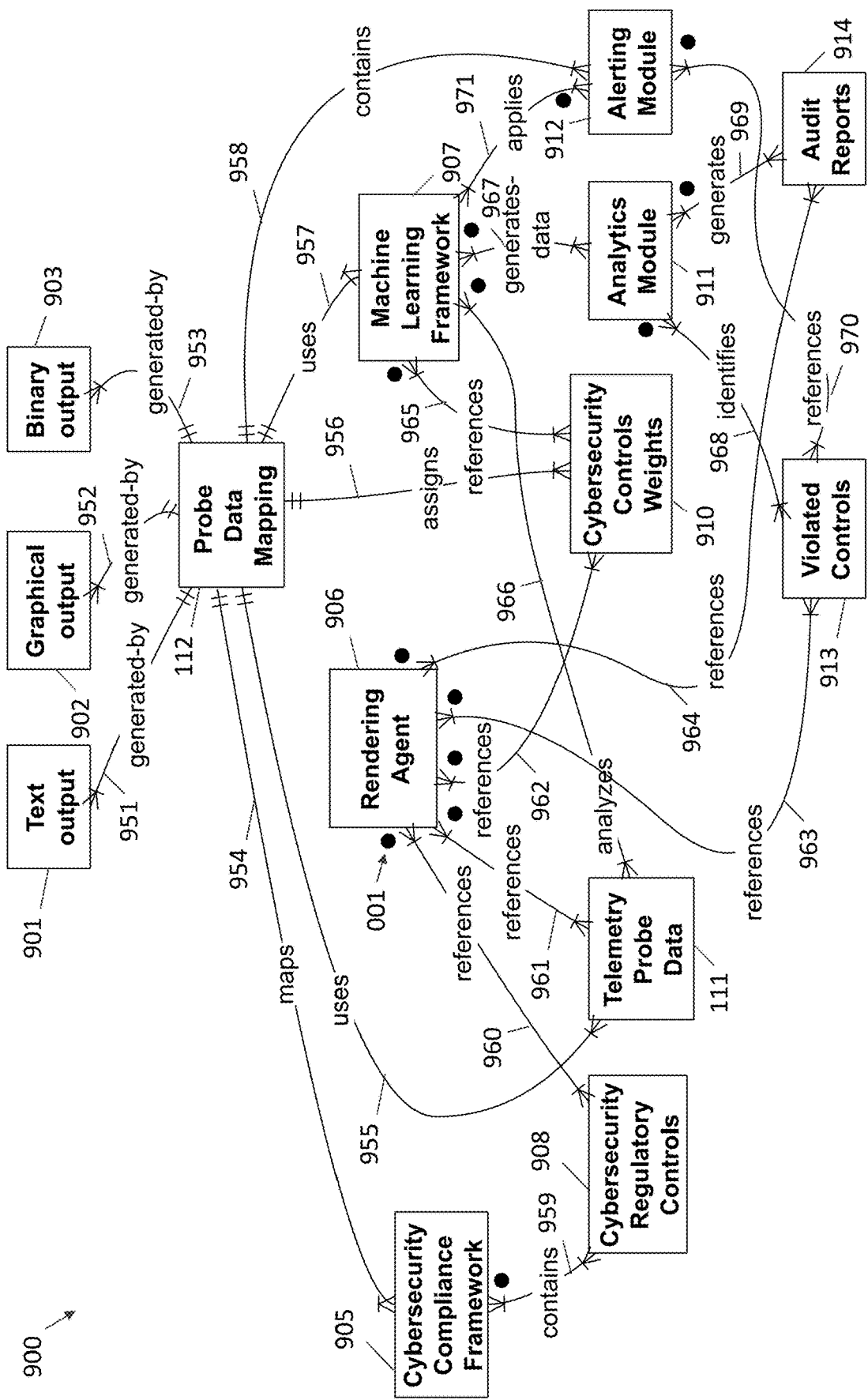
FIG. 9: shows a system 900 for telemetry probe data mapping and representation, according to some embodiments.

The system and methods for unforgeable telemetry in the presence of cyberattacks on a computer platform 101 may rely heavily on probe data mapping 112 and probe data representation 113. FIG. 9 shows a system 900 for telemetry probe data mapping and representation, according to some embodiments. In some embodiments, system 900 may be a subsystem within system 100.

Text output 901, graphical output 902, and binary output 903 may be generated by (see connecting lines 951, 952, and 953) probe data mapping 112. Probe data mapping 112 maps to (see connecting line 954) a cybersecurity compliance framework 905, uses (see connecting line 955) telemetry probe data 111, assigns (see connecting line 956) cybersecurity control weights 910, uses (see connecting line 957) a machine learning framework 907, and contains (see connecting line 958) an alerting module 912. Machine learning framework 907 generates data (see connecting line 967) in connection with analytics module 911, applies (see connecting line 971) an alerting module 912, references (see connecting line 965) cybersecurity control weights 910, and analyzes (see connecting line 966) telemetry probe data 111. A rendering agent 906 references cybersecurity regulatory controls 908 (see connecting line 960), telemetry probe data 111 (see connecting line 961), cybersecurity control weights 910 (see connecting line 962), violated controls 913 (see connecting line 963) and audit reports 964 (see connecting line 964). Analytics module 911 identifies (see connecting line 968) violated controls 913, and generates (see connecting line 969) audit reports 914. Alerting module references (see connecting line 970) violated control 913.

Probe data mapping 112 refers to the process of creating a one-to-one correspondence between specific data points collected from various sources within the system and a corresponding set of metadata that describes each data point's relevance, importance, and context. This mapping enables the accurate and reliable representation of probe data 111 in a format that can be easily understood by humans or machines.

The telemetry probe data mapping 112 process commences with identifying specific cybersecurity compliance frameworks 905 from which to obtain cybersecurity regulatory controls 908 levels. For instance, consider a system administrator responsible for ensuring compliance with NIST SP 800-53, a widely adopted standard for information security and risk management. In this scenario, the system administrator would need to map telemetry data against relevant controls within the NIST framework, such as AC-2 (Access Control), AC-3 (Access Control for Cloud Computing), or AU-6 (Audit and Accountability).

Similarly, in a FedRAMP-compliant environment, an organization might need to ensure that telemetry data is mapped against specific security requirements outlined in the FedRAMP Security Assessment Report. This would involve identifying relevant controls from the FedRAMP list, such as FISMA-2 (Risk Management), FISMA-3 (Information Systems Acquisition Under FISMA), or FISMA-4 (Security and Internal Controls).

In other cases, an organization might be subject to STIG (Security Technical Implementation Guides) requirements, which provide detailed guidance on implementing specific cybersecurity regulatory controls 908 across various systems. To ensure compliance with these guidelines, the system administrator would need to map telemetry data against relevant STIG requirements, such as DISA STIG OS, DISA STIG DB2, or DISA STIG Oracle.

Furthermore, consider a scenario where an organization operates under CMMC (Cybersecurity Maturity Model Certification) guidelines. In this case, the system administrator would need to ensure that telemetry data is mapped against relevant process areas within the CMMC framework, such as ID (Risk Management), PP (Protect Information and Media Handling), or PT (Protect System Resources).

Once the relevant frameworks have been identified, a rendering agent 906 is employed to assign specific cybersecurity controls weights 910 or priorities to each framework based on its relevance and importance to the particular application, industry, or government/federal sector. The weights can be determined through a combination of expert judgment, industry benchmarks, and quantitative risk analysis. Once the cybersecurity control weights 910 are determined, they are integrated into a machine learning framework 907 as input features or used to adjust the model's output probabilities. This nuanced approach ensures that the most critical control levels receive adequate attention and scrutiny.

By integrating machine learning algorithms into the telemetry probe data mapping 112 process, anomalies in collected probe data mappings 112 can be identified, indicating potential security threats.

The system further comprises probe data representation 113, which is a mechanism to represent the mapped data as text output 901, a graphical output 902 and/or a binary output 903. This helps represent the telemetry probe data 111 as textual information, graphical user interface, or raw binary data. This flexibility enables users to visualize and interpret the mapped data in their preferred format. A GUI display presents the mapped data in a format selected from the group consisting of textual, raw, and graphical.

The system includes an analytics module 911 that provides detailed analysis and insights into the mapped data, generating comprehensive audit reports 914 that enable organizations to demonstrate compliance with relevant cybersecurity regulations and standards, such as NIST SP 800-53, FedRAMP, STIG, or CMMC. These reports provide a clear and accurate picture of an organization's security posture, highlighting areas of strength and weakness, and identifying opportunities for improvement. By leveraging these audit reports 914, organizations can ensure the ongoing integrity and authenticity of their telemetry data, while also maintaining compliance with relevant cybersecurity regulations and standards.

The analytics module 911 interacts with the machine learning framework 907 to receive predicted outputs and anomaly scores for incoming telemetry probe data 111. The analytics module 911 consists of a control violation detection engine which analyzes the predicted outputs from the machine learning framework 907 and checks them against a predefined set of cybersecurity controls, including but not limited to access control lists, firewall rules, and encryption policies and identifies violated controls 913. The analytics module 911 also generates Audit Reports 914, which creates a comprehensive summary of control violations, providing a historical record of security incidents and compliance issues.

Finally, the system includes an alerting module 911 which notifies users or security personnel when specific thresholds or criteria are met based on the mapped telemetry probe data 111. The alerting module 911 ensures that potential security threats are promptly identified and addressed. Similarly, an alerting mechanism notifies users or security personnel when specific cybersecurity regulatory controls 908 were violated based on the mapped probe data.

The alerting module 911 consists of three primary components: (a) alert generation-this component receives telemetry probe data 11 from various sources, including system logs, network traffic, and application performance metrics. It applies machine learning framework 907 to identify patterns and anomalies that may indicate potential security threats; (b) alert filtering and prioritization—this component uses the cybersecurity control weights 910 to evaluate the severity and impact of each generated alert. Alerts are filtered based on their assigned weight, with higher-weighted alerts being prioritized for immediate attention. This ensures that the most critical security incidents receive prompt notification and response; (c) notification and escalation—this component is responsible for sending notifications to designated personnel via email, SMS, or other communication channels. The module can also integrate with incident response tools and workflows to automate escalation procedures and ensure timely remediation.

Figure 10:
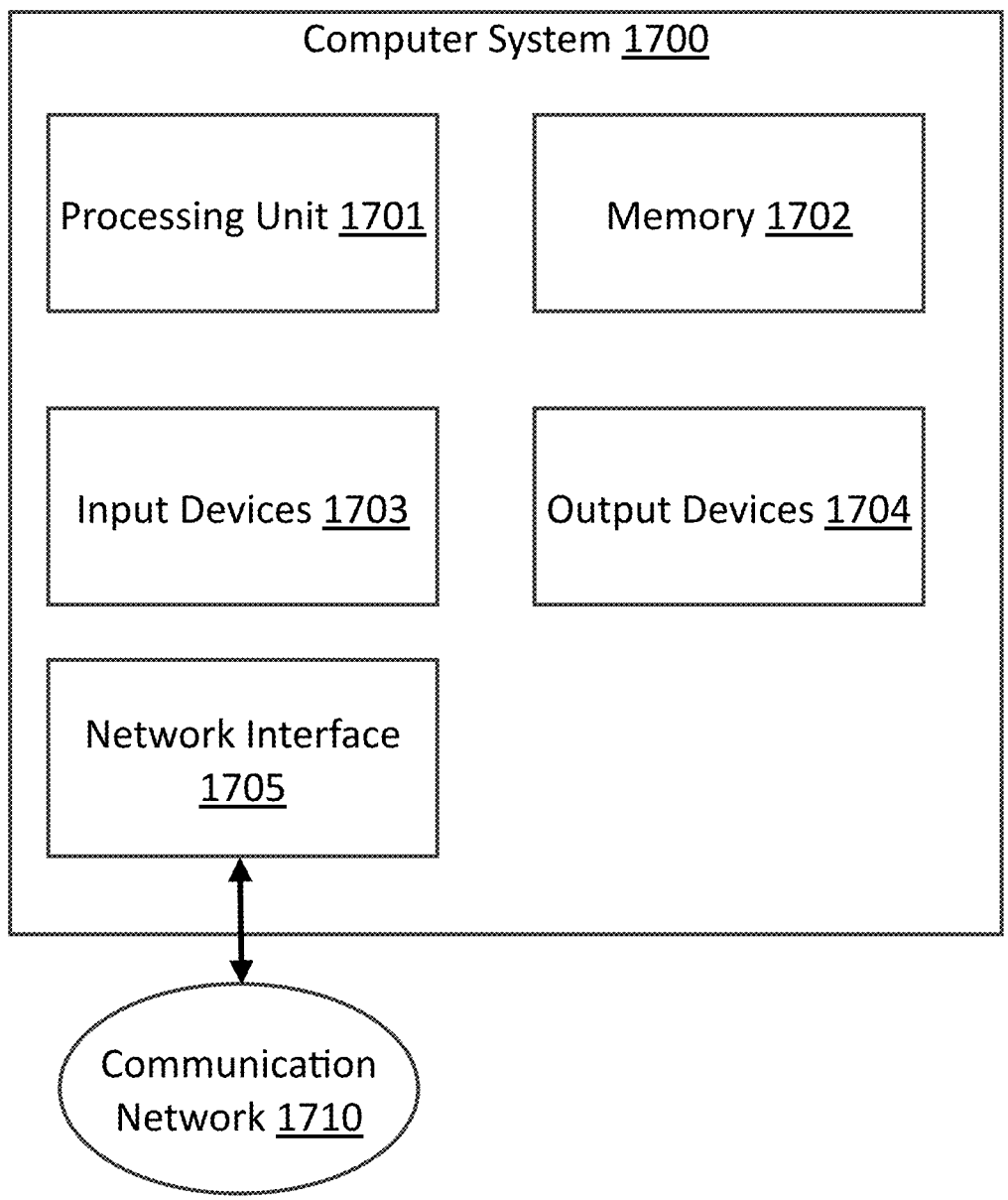
FIG. 10 shows, schematically, an illustrative computer system 1700 on which aspects of the present disclosure may be implemented.

FIG. 10 shows, schematically, an illustrative computer system 1700 on which aspects of the present disclosure may be implemented. For example, computer system 1700 may be used to implement system 100 and/or the subsystems discussed herein. In the example of FIG. 10, the computer system 1700 includes a processing unit 1701 having one or more computer hardware processors and one or more articles of manufacture that comprise at least one non-transitory computer-readable storage medium (e.g., a memory 1702) that may include, for example, volatile and/or non-volatile memory. Memory 1702 may store one or more instructions to program the processing unit 1701 to perform any of the functions described herein. Memory 1702 may also store one or more application programs and/or resources used by application programs (e.g., software libraries). Different portions of memory 1702 may be used for different storage purposes. For example, a non-volatile portion of memory 1702 may be used for long term storage, while volatile memory may be used to facilitate fast access for processing unit 1702. Though, memory 1702 may include any suitable type or combination of types of computer storage media that are able to store data. To perform any of the illustrative functionalities described herein, processing unit 1701 may execute one or more processor-executable instructions stored in memory 1702, which may serve as non-transitory computer-readable media storing processor-executable instructions for execution by the processing unit 1701.

The computer system 1700 may have one or more input devices and/or output devices, such as devices 1703 and 1704 illustrated in FIG. 10. These devices may be used, for instance, to present a user interface. Examples of output devices that may be used to provide a user interface include printers, display screens, and other devices for visual output, speakers and other devices for audible output, braille displays and other devices for haptic output, etc. Examples of input devices that may be used for a user interface include keyboards, pointing devices (e.g., mice, touch pads, and digitizing tablets), microphones, etc. For instance, the input devices 1703 may include a microphone for capturing audio signals, and the output devices 1704 may include a display screen for visually rendering, and/or a speaker for audibly rendering, recognized text.

In the example of FIG. 10, computer system 1700 also includes one or more network interfaces (e.g., a network interface 1705) to enable communication via various networks (e.g., a network 1710). Computer networks include, for example and not limitation, local area networks (e.g., an enterprise network) and wide area networks (e.g., the Internet). Such networks may be based on any suitable technology operating according to any suitable protocol, and may include wireless networks and/or wired networks (e.g., fiber optic networks). It should be appreciated that components of computer system 1700 may be distributed across a computer network; this may be done, for example, to facilitate distributed processing, to achieve connectivity with (e.g., remote) input devices and/or output devices, or for any other suitable reason.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices 103. These devices 103 can be used, among other things, to present a user interface. Examples of output devices 103 that can be used to provide a user interface include printers or display screens for visual presentation of output and speakers or other sound generating devices 103 for audible presentation of output. Examples of input devices 103 that can be used for a user interface include keyboards, and pointing devices 103, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices 103, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

As used herein, a "set" may have one or more members. For example, "a set of programs" could have a single program or multiple programs. As used herein "subset" of a set may have the same number of members as the set or fewer members than the set but at least one member of the set. For example, a set of programs consisting of programs A, B, and C could be divided into the following seven subsets A; B; C; A, B; A, C; B, C; and A, B, C. A set may also be formed from other sets. For example, set X may be made up of set Y and set Z; that is set Y and set Z are each a subset of set X.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices 103. Generally, program modules include routines, programs, objects, components, data structures, etc. that perform particular tasks or implement particular abstract data types. The functionality of the program modules may be combined or distributed as desired in various embodiments.

In this document, various aspects may be described algorithmically. While exemplary algorithms may be provided, the desired functionality may be implemented in any suitable way. One of skill in the art may implement such functionality or algorithms, for example, in hardware, in software, or in a combination of hardware and software. A module may comprise the hardware and/or software, to implement the functionality or algorithm disclosed. For example, in some embodiments an algorithm may be implemented through a module having one or more processors executing computer code stored on one or more non-transitory computer-readable storage media. In some embodiments, a functionality is implemented at least in part through a module having dedicated hardware (e.g., an ASIC, an FPGA). In some embodiments modules may share components. For example, a first function module and a second function module may both utilize a common processor (e.g., through time-share or multithreading) or have computer executable code stored on a common computer storage medium (e.g., at different memory locations).

In some instances, an embodiment of a module may be identified explicitly or implicitly as a hardware module or a software module. A hardware module includes or shares the hardware for implementing the capability of the module. A hardware module may include software (e.g., it may include a software module). A software module comprises information that may be stored, for example, on a non-transitory computer-readable storage medium. In some embodiments, the information may comprise instructions executable by one or more processors. In some embodiments, the information may be used at least in part to configure hardware such as an FPGA. In some embodiments, an algorithm may be recorded as a software module. The capability may be implemented, for example, by reading the software module from a storage medium and executing it with one or more processors, or by reading the software module from a storage medium and using the information to configure hardware.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A computer platform comprising:
   at least one peripheral;
   at least one processor; and
   at least one non-transitory computer-readable storage medium having stored thereon
      a set of programs, the programs of the set of programs executable by the at least one processor, having respective code paths, different privilege levels and utilizing different memory address spaces of the at least one non-transitory computer-readable storage medium;
      a telemetry provisioner that utilizes a mathematical model of the computer platform to identify and implant immutable telemetry probes in code paths of a subset of the set of programs; and
   wherein,
      the set of programs includes a set of secure-kernel programs and a set of regular programs;
      the mathematical model includes a formal representation of the at least one processor, the at least one non-transitory computer-readable storage medium, the at least one peripheral, and the set of programs, and defines and proves a security property that ensures execution flow of the programs in the set of programs follows the respective code paths; and
      the telemetry provisioner uses the mathematical model to determine probe placement and configuration to monitor and enforce telemetry execution flow and trigger integrity; and
      a subset of the set of secure-kernel programs utilizes the mathematical model to enforce the security property at runtime by verifying that the execution flow of the programs in the set of programs conforms to the mathematical model.

2. The computer platform of claim 1 wherein
   the at least one peripheral, the at least one processor, and the at least one non-transitory computer-readable storage medium are hardware elements of the computer platform;

the programs in the set of programs are software stack elements;

the mathematical model stored on the at least one non-transitory computer-readable storage medium further defines operational aspects of the hardware elements and software stack elements;

the mathematical model further defines predicates that are translatable to proof obligations; and the mathematical model includes a theorem prover to interpret and verify the proof obligations.

3. The computer platform of claim 1, wherein at least one of the memory address spaces includes a secure memory region to store telemetry probe data collected from the immutable telemetry probes in an append-only fashion.

4. The computer platform of claim 3, wherein the set of secure-kernel programs includes a platform signing agent to transmit the telemetry probe data from the secure memory region to a non-volatile portion of the at least one non-transitory computer-readable storage medium.

5. The computer platform of claim 1, wherein the programs in the set of programs comprise forward edge execution flow integrity (EFI) protection, backward edge execution flow integrity (EFI) protection, and stack-frame protection.

6. The computer platform of claim 1, wherein when a member of the set of secure-kernel programs is executed by the at least one processor the computer platform loads a subset of the set of regular programs within a given privilege level and memory address space of the computer platform.

7. The computer platform of claim 1, wherein when a member of the set of secure-kernel programs is executed by the at least one processor the computer platform loads a first secure-kernel program of the set of secure-kernel programs and a subset of the set of regular programs within a privilege level different from the member and a memory address space different from the member, and validates an integrity of the first secure-kernel program.

8. The computer platform of claim 1, wherein a member of the set of secure-kernel programs, when executed by the at least one processor, establishes a memory protected probe data log in the at least one non-transitory computer-readable storage medium, the memory protected probe data log being protected from unauthorized access from non-secure kernel elements and is only accessible by the set of secure secure-kernel programs.

9. The computer platform of claim 8, wherein the set of secure-kernel programs comprises a logging function that, when executed by the at least one processor, records telemetry data from the immutable telemetry probes to the memory protected probe data log periodically based on a periodic secure timer.

10. The computer platform of claim 1 wherein the telemetry provisioner computes original hash values;

the set of secure kernel programs comprises a telemetry probe authorization module that, when executed by the at least one processor, validates the immutable telemetry probes;

the telemetry probe authorization module includes a hashmap for mapping program code regions to the original hash values; and the telemetry probe authorization module computes a hash of the program code regions and compares it to the respective original hash value, and if the comparison is successful (a match), control is transferred to an entry point of of the program, and if the comparison is unsuccessful (not a match) an error is logged into a memory protected probe data log and the program is terminated.

11. The computer platform of claim 1 wherein a subset of the set of secure-kernel programs modifies a telemetry probe among the immutable telemetry probes by (i) marking a code region of the telemetry probe read-write using a memory protection mechanism, (ii) changing code for the telemetry probe at a target location with a telemetry probe code template, (iii) marking the code region of the telemetry probe read-only using the memory protection mechanism, (iv) comparing a hash of the telemetry probe code to a hash of the telemetry probe code template, wherein a match signifies a successful telemetry probe code modification, and (v) if the comparing does not yield a match, logging an error in a telemetry probe log.

12. The computer platform of claim 1, wherein the immutable telemetry probes collect telemetry probe data which is then mapped to cybersecurity regulatory control levels specified in a cybersecurity compliance frameworks, the cybersecurity compliance frameworks selected from the group consisting of industry-specific and government/federal agency specific guidelines.

13. A system for generating a telemetry provisioner and set of secure-kernel programs, the system comprising:

a mathematical model creation module that creates a mathematical model of a computer platform;

a theorem proving module that analyzes the mathematical model to determine whether a telemetry execution flow and trigger integrity (TEFTI) security property is satisfied;

a code generation module that generates the set of secure-kernel programs that enforce the TEFTI security property; and a telemetry provisioner generation module that generates a telemetry provisioner for configuring a set of programs with a set of rules to collect and log telemetry data, wherein the telemetry provisioner ensures that the TEFTI security property is preserved by the set of programs during runtime on the computer platform, and the set of programs comprises the set of secure-kernel programs and a set of regular programs.

14. The system of claim 13, further comprising the computer platform, the computer platform having at least one processor and at least one non-transitory computer-readable storage medium, the at least one non-transitory computer-readable storage medium having stored thereon the set of programs and the telemetry provisioner, wherein the set of programs and the telemetry provisioner comprise code executable by the at least one processor.

15. The system of claim 14, wherein, during runtime on the computer platform, the telemetry provisioner ensures the TEFTI security property is preserved by:

using a source-code or binary-level modification technique to embed the TEFTI security property into a subset of the set of programs;

implementing memory protection mechanisms to prevent modifications to code regions and procedure linkage table (PLT) regions of the subset of the set of programs; and configuring the subset of the set of programs to enforce control flow integrity (CFI) and protect stack frames.

16. At least one non-transitory computer-readable storage medium having stored thereon instructions which, when executed, program at least one processor to perform a method comprising acts of:

creating a mathematical model of a computer platform, wherein the mathematical model includes a representation of a telemetry execution flow and trigger integrity (TEFTI) security property;

analyzing the mathematical model to determine whether the TEFTI security property is satisfied, the analyzing comprising
- encoding the TEFTI security property into a computer-assisted theorem proving system; and
- using the computer-assisted theorem proving system to analyze the mathematical model and determine if the TEFTI security property is satisfied; and generating a telemetry provisioner for configuring a set of programs with a set of rules to collect and log telemetry data, wherein
- the set of programs includes the set of secure-kernel programs and a set of regular programs; and
- the telemetry provisioner ensures that the TEFTI security property is preserved by the set of programs during system runtime.

17. The at least one non-transitory computer-readable storage medium of claim 16, wherein the telemetry provisioner ensures the TEFTI security property is preserved during runtime by:
- using a source-code or binary-level modification technique to embed the TEFTI security property into a subset of the set of programs;
- implementing memory protection mechanisms to prevent modifications to code regions and procedure linkage table (PLT) regions of the subset of the set of programs; and
- configuring the subset of the set of programs to enforce control flow integrity (CFI) and protect stack frames.

18. The at least one non-transitory computer-readable storage medium of claim 16, wherein the set of rules to collect and log telemetry data includes:
- collecting address space information for each process;
- collecting process identifier information for each process;
- collecting register state information for each process;
- collecting time information for each process;
- collecting function name information for each function call;
- collecting parameter information for each function call;
- collecting stack trace variable information for each function call; and
- logging program data flow information.

19. The at least non-transitory one computer-readable storage medium of claim 16, wherein the set of rules to collect and log telemetry data includes:
- monitoring program behavior to detect cyber attacks;
- analyzing telemetry data to identify patterns indicative of cyber attacks;
- generating alerts in response to detected cyber attacks; and
- logging program data flow information to facilitate incident response.

20. The at least one non-transitory computer-readable storage medium of claim 16, wherein the set of rules to collect and log telemetry data includes:
- defining a set of thresholds for each type of telemetry data;
- comparing telemetry data to the defined thresholds; and
- generating alerts in response to exceeded thresholds.

21. A method comprising:

creating a mathematical model of a computer platform, wherein the mathematical model includes a representation of a telemetry execution flow and trigger integrity (TEFTI) security property;

analyzing the mathematical model to determine whether the TEFTI security property is satisfied, the analyzing comprising
- encoding the TEFTI security property into a computer-assisted theorem proving system; and
- using the computer-assisted theorem proving system to analyze the mathematical model and determine if the TEFTI security property is satisfied; and generating a telemetry provisioner for configuring a set of programs with a set of rules to collect and log telemetry data, wherein
- the set of programs includes the set of secure-kernel programs and a set of regular programs; and
- the telemetry provisioner ensures that the TEFTI security property is preserved by the set of programs during system runtime.

* * * * *